(12) United States Patent
Gruentzig

(10) Patent No.: US 12,478,324 B2
(45) Date of Patent: Nov. 25, 2025

(54) SENSORS FOR WEARABLE DEVICES

(71) Applicant: Legionarius, LLC, Wilmington, DE (US)

(72) Inventor: Alexander Gruentzig, Sudbury, MA (US)

( * ) Notice: Subject to any disclaimer, the term of this patent is extended or adjusted under 35 U.S.C. 154(b) by 1451 days.

(21) Appl. No.: 16/787,799

(22) Filed: Feb. 11, 2020

(65) Prior Publication Data
US 2020/0261022 A1 Aug. 20, 2020

Related U.S. Application Data

(60) Provisional application No. 62/807,828, filed on Feb. 20, 2019.

(51) Int. Cl.
| | |
|---|---|
| A61B 5/00 | (2006.01) |
| A61B 17/135 | (2006.01) |
| G01L 5/00 | (2006.01) |
| G01L 5/14 | (2006.01) |
| G06F 1/16 | (2006.01) |
| A61B 17/00 | (2006.01) |
| F41H 1/00 | (2006.01) |

(52) U.S. Cl.
CPC ........ *A61B 5/6804* (2013.01); *A61B 17/1355* (2013.01); *G01L 5/14* (2013.01); *G06F 1/163* (2013.01); *A61L 2400/04* (2013.01)

(58) Field of Classification Search
CPC .............. A61B 5/6804; A61B 17/1355; A61B 2017/00022; A61B 2017/00221; A61B 5/0048; G01L 5/14; G01L 5/0052; G06F 1/163; A61L 2400/04; F41H 1/00
See application file for complete search history.

(56) References Cited

U.S. PATENT DOCUMENTS

| | | |
|---|---|---|
| 451,197 A | 4/1891 | Robare |
| 1,042,314 A | 10/1912 | Brion |
| 3,193,842 A | 7/1965 | Bell |

(Continued)

FOREIGN PATENT DOCUMENTS

| | | |
|---|---|---|
| EP | 2040997 B1 | 5/2011 |
| WO | WO-92/13074 A1 | 8/1992 |

(Continued)

OTHER PUBLICATIONS

International Search Report and Written Opinion for International Patent Application No. PCT/US2015/028912, mailed Dec. 29, 2015 (21 pages).

(Continued)

*Primary Examiner* — Justin Xu

(57) ABSTRACT

Featured are impact detection sensors that include a non-conductive layer disposed between two conductive layers. Each conductive layer includes an electrical circuit configured to generate a signal in response to an impact. Also featured are devices (e.g., a wearable device or device configured for use with a piece of equipment, such as a vehicle) including a plurality of impact detection sensors. The device having sensors can receive and process data from the sensors and provide situational awareness for users in adverse conditions, such as during combat or wartime. The wearable device may further include one or more inflatable bladders configured to apply pressure to a wound site for treatment.

27 Claims, 39 Drawing Sheets

(56) References Cited

U.S. PATENT DOCUMENTS

| | | | |
|---|---|---|---|
| 3,819,962 | A | 6/1974 | Ivey et al. |
| 3,933,150 | A | 1/1976 | Kaplan et al. |
| 5,090,053 | A | 2/1992 | Hayes |
| 5,092,607 | A | 3/1992 | Ramsay et al. |
| 5,195,752 | A | 3/1993 | Reeves et al. |
| 5,636,378 | A | 6/1997 | Griffith |
| 5,867,842 | A | 2/1999 | Pinsley et al. |
| 6,012,162 | A | 1/2000 | Bullat |
| 6,032,299 | A | 3/2000 | Welsh |
| 6,042,147 | A | 3/2000 | Nishijima et al. |
| 6,198,394 | B1 | 3/2001 | Jacobsen et al. |
| 6,349,201 | B1 | 2/2002 | Ford |
| 6,467,342 | B1* | 10/2002 | Gieseke .............. G01L 5/14 |
| | | | 73/167 |
| 6,757,916 | B2 | 7/2004 | Mah et al. |
| 6,939,314 | B2 | 9/2005 | Hall et al. |
| 6,997,218 | B1 | 2/2006 | Garcia et al. |
| 7,056,179 | B2 | 6/2006 | Courtney |
| 7,107,839 | B1 | 9/2006 | Berman et al. |
| 7,288,011 | B2 | 10/2007 | Ganley |
| 7,329,792 | B2 | 2/2008 | Buckman et al. |
| 7,548,168 | B2 | 6/2009 | Ishikawa et al. |
| D596,829 | S | 7/2009 | Miller |
| 7,921,472 | B2 | 4/2011 | Mazzarolo |
| 8,079,247 | B2 | 12/2011 | Russell et al. |
| 8,231,421 | B1 | 7/2012 | Hubbard et al. |
| 8,591,275 | B2 | 11/2013 | Gonsalves et al. |
| 9,058,733 | B2 | 6/2015 | Brinkley et al. |
| D743,146 | S | 11/2015 | Yerby |
| 9,242,093 | B1 | 1/2016 | Sherman |
| D775,786 | S | 1/2017 | Trabert |
| 9,600,995 | B2 | 3/2017 | Gaidar et al. |
| 10,052,223 | B2 | 8/2018 | Turner |
| D905,935 | S | 12/2020 | Gruentzig |
| 10,856,884 | B2 | 12/2020 | Carabajal |
| 10,874,152 | B2 | 12/2020 | Gruentzig |
| 11,051,565 | B2 | 7/2021 | Gruentzig |
| 11,173,992 | B2 | 11/2021 | Gruentzig |
| D943,244 | S | 2/2022 | Gruentzig |
| 11,471,112 | B2 | 10/2022 | Gruentzig |
| 2005/0067816 | A1 | 3/2005 | Buckman |
| 2006/0267779 | A1 | 11/2006 | Ishikawa et al. |
| 2007/0061941 | A1 | 3/2007 | Makabe et al. |
| 2007/0144396 | A1 | 6/2007 | Hamel et al. |
| 2007/0260407 | A1 | 11/2007 | Van Albert et al. |
| 2008/0105114 | A1 | 5/2008 | Gabrys |
| 2009/0058642 | A1 | 3/2009 | Fukumura |
| 2010/0083733 | A1* | 4/2010 | Russell .............. F41H 1/02 |
| | | | 2/455 |
| 2010/0274100 | A1 | 10/2010 | Behar et al. |
| 2010/0326192 | A1 | 12/2010 | Petelenz et al. |
| 2011/0098934 | A1 | 4/2011 | Hubler et al. |
| 2011/0204114 | A1 | 8/2011 | Miller |
| 2012/0060260 | A1 | 3/2012 | Kochling |
| 2012/0102630 | A1 | 5/2012 | Anderson |
| 2012/0118449 | A1 | 5/2012 | Barnes et al. |
| 2012/0144934 | A1 | 6/2012 | Russell et al. |
| 2012/0180179 | A1 | 7/2012 | Lee et al. |
| 2012/0198593 | A1* | 8/2012 | Beck .............. F41J 5/04 |
| | | | 2/2.5 |
| 2012/0246788 | A1 | 10/2012 | Harrell et al. |
| 2013/0058906 | A1 | 3/2013 | Turzi |
| 2013/0131566 | A1 | 5/2013 | Bodansky |
| 2013/0210297 | A1 | 8/2013 | Maas et al. |
| 2014/0023579 | A1 | 1/2014 | van Vliet et al. |
| 2014/0070957 | A1* | 3/2014 | Longinotti-Buitoni .............. |
| | | | A61B 5/02055 |
| | | | 340/870.01 |
| 2014/0236221 | A1 | 8/2014 | Zhadkevich |
| 2015/0143875 | A1* | 5/2015 | Wong .............. G01L 23/00 |
| | | | 73/35.14 |
| 2015/0173433 | A1 | 6/2015 | Mazzarolo et al. |
| 2015/0374060 | A1 | 12/2015 | Morgan |
| 2016/0008206 | A1 | 1/2016 | Devanaboyina |
| 2016/0379461 | A1 | 12/2016 | Gaidar et al. |
| 2017/0049164 | A1 | 2/2017 | Gruentzig |
| 2017/0154521 | A1 | 6/2017 | Zamorano-Larrate |
| 2017/0193858 | A1 | 7/2017 | Segall |
| 2018/0214161 | A1 | 8/2018 | Carabajal |
| 2018/0303383 | A1* | 10/2018 | Connor .............. G06F 3/014 |
| 2019/0069623 | A1 | 3/2019 | Kuntz |
| 2019/0208841 | A1 | 7/2019 | Gruentzig |
| 2020/0023927 | A1 | 1/2020 | Gruentzig |
| 2020/0237318 | A1 | 7/2020 | Gruentzig |
| 2020/0247513 | A1 | 8/2020 | Garner et al. |
| 2020/0277033 | A1 | 9/2020 | White |
| 2021/0145450 | A1 | 5/2021 | Gruentzig |
| 2021/0401075 | A1 | 12/2021 | Gruentzig |
| 2025/0194756 | A1 | 6/2025 | Gruentzig |

FOREIGN PATENT DOCUMENTS

| | | | |
|---|---|---|---|
| WO | WO-2006/086402 | A2 | 8/2006 |
| WO | WO-2007/142887 | A1 | 12/2007 |
| WO | WO-2015/183470 | A2 | 12/2015 |
| WO | WO-2017/0049164 | A1 | 2/2017 |
| WO | WO-2018/213615 | A2 | 11/2018 |

OTHER PUBLICATIONS

International Preliminary Report on Patentability for International Patent Application No. PCT/US2015/028912, issued Nov. 1, 2016 (11 pages).

International Search Report and Written Opinion for International Patent Application No. PCT/US2018/033241, mailed Aug. 13, 2018 (11 pages).

International Search Report and Written Opinion for International Patent Application No. PCT/US2018/013665, mailed May 25, 2018 (17 pages).

Zobel et al., "Effects of the high-affinity corticotropin-releasing hormone receptor 1 antagonist R121919 in major depression: the first 20 patients treated," Journal of Psychiatric Research. 34(3):171-181 (2000).

U.S. Appl. No. 18/670,095, Gruentzig, Alexander.

* cited by examiner

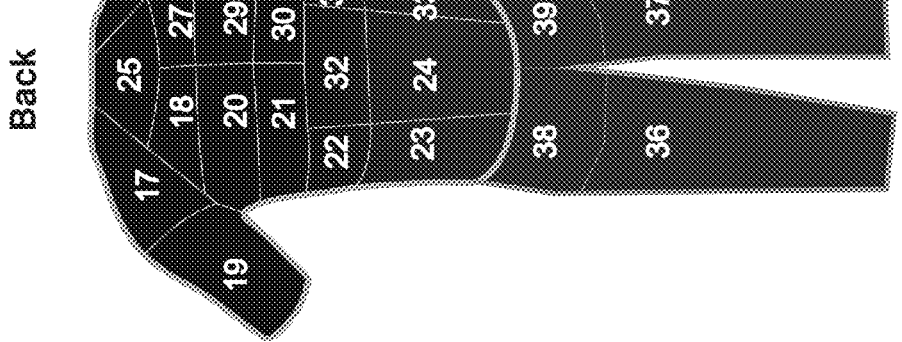
FIG. 1B Back
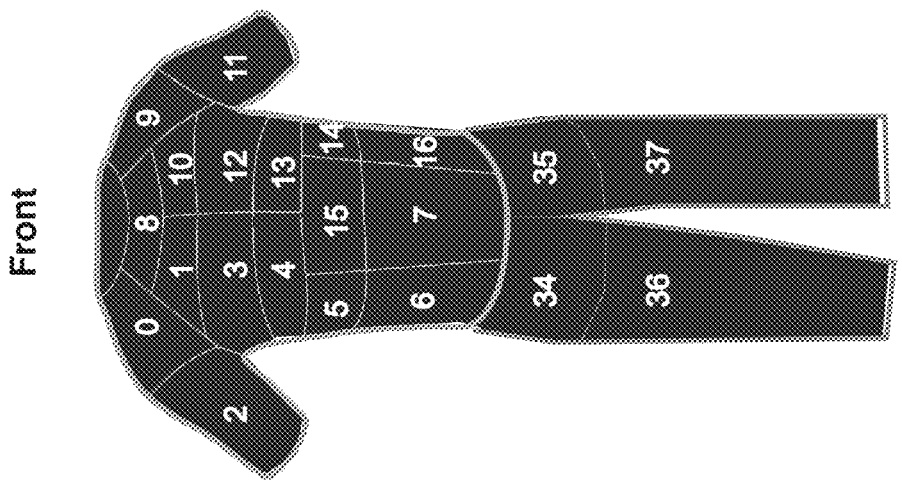
FIG. 1A Front

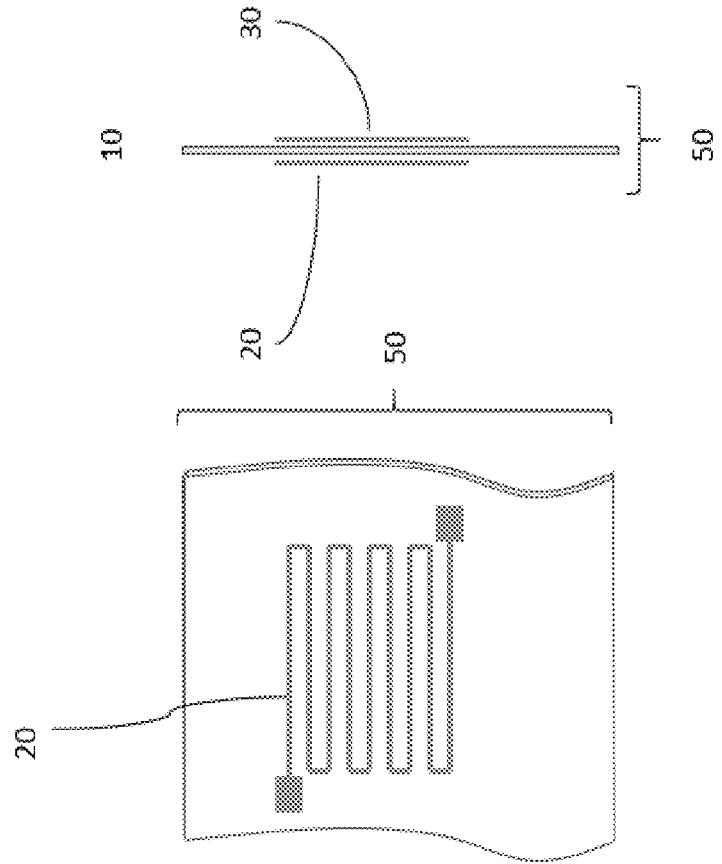
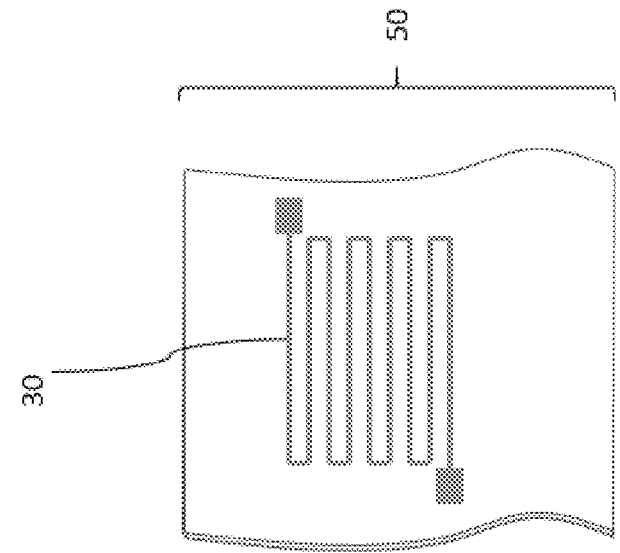

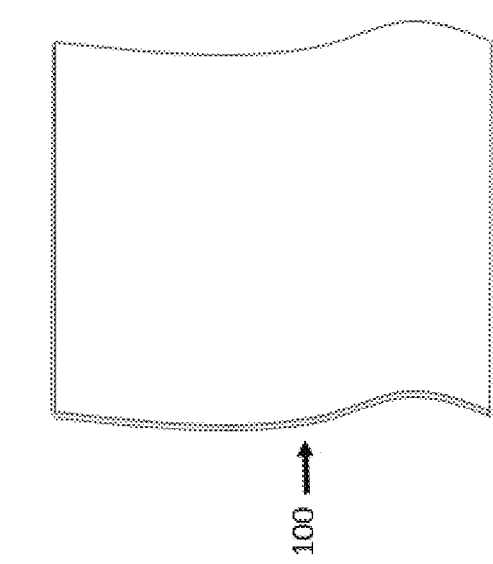
FIG. 4C
FIG. 4B
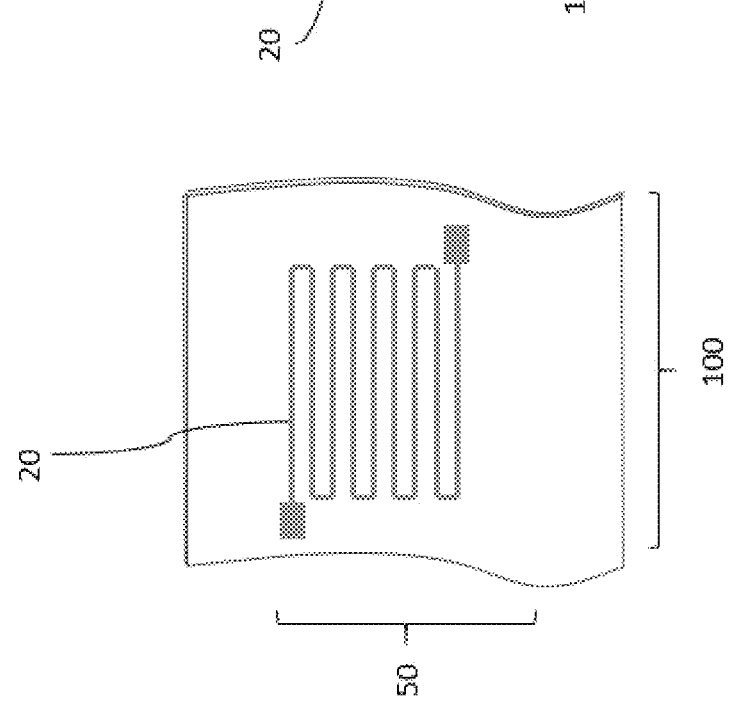
FIG. 4A

600

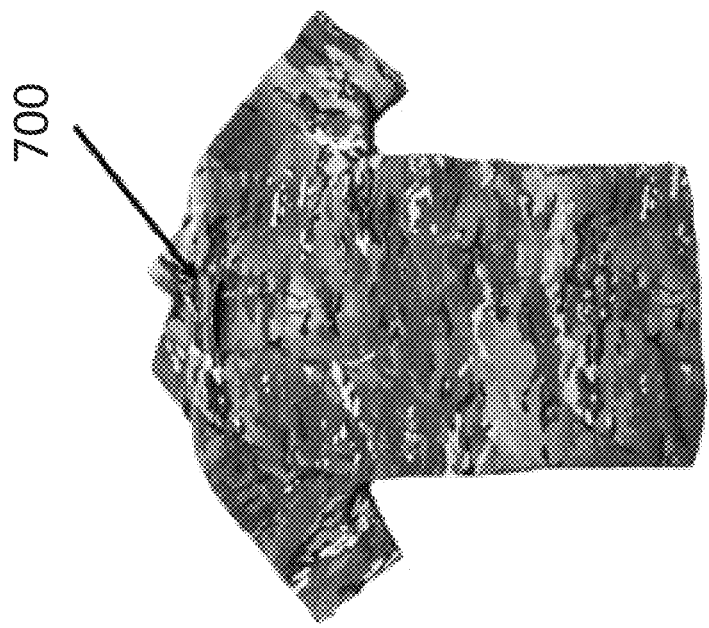
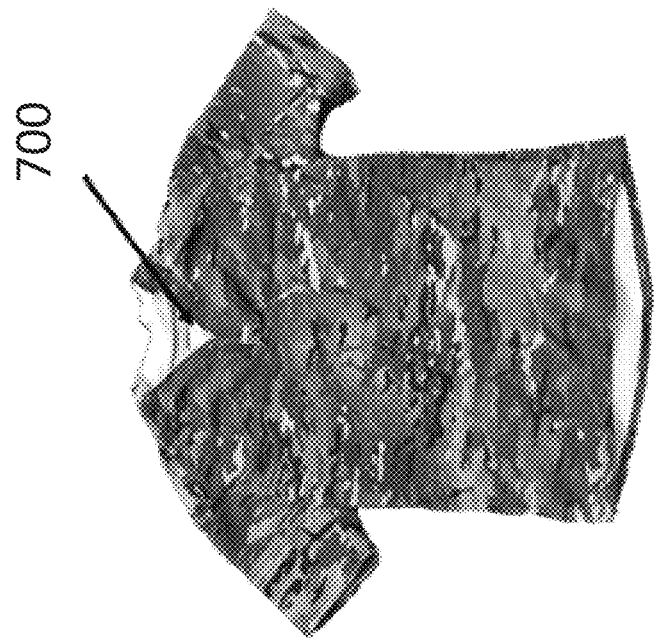

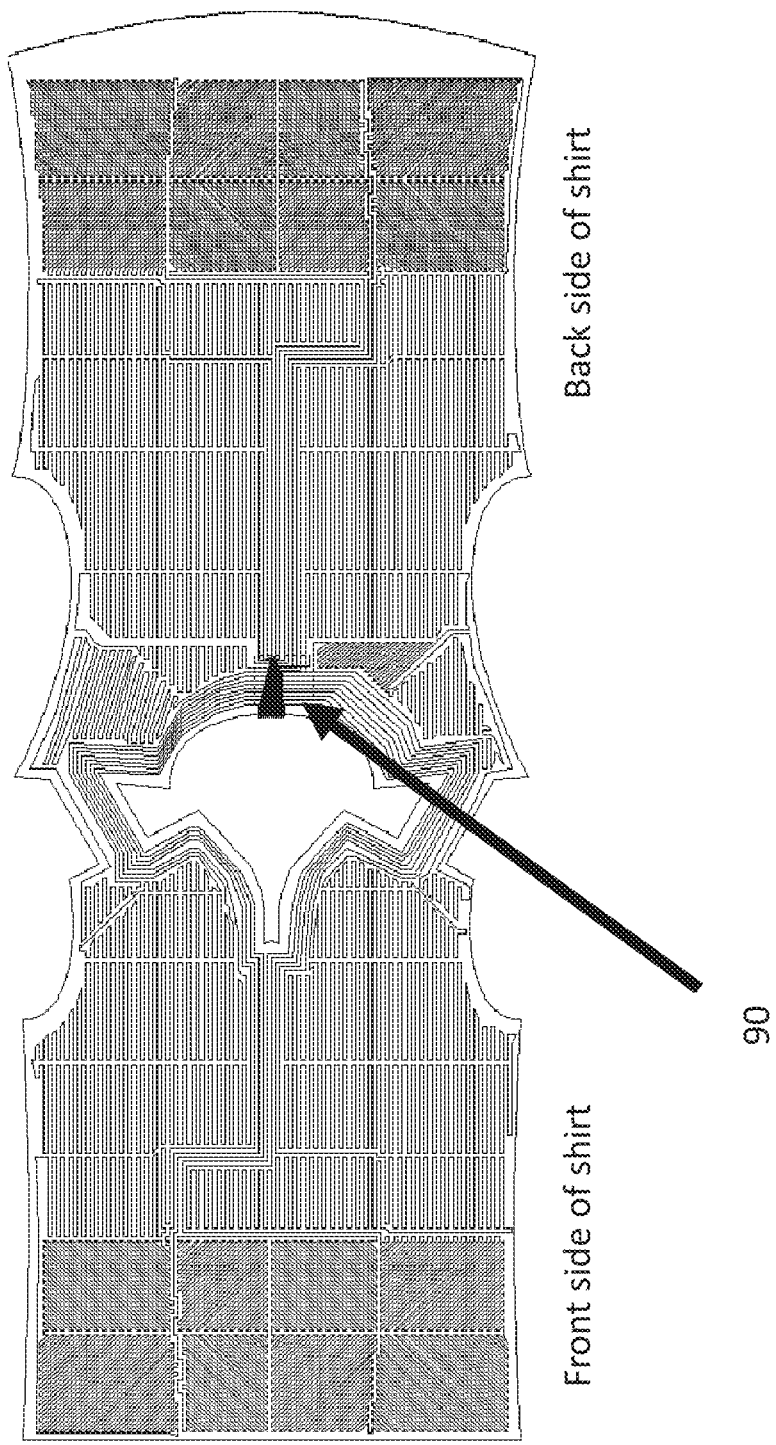

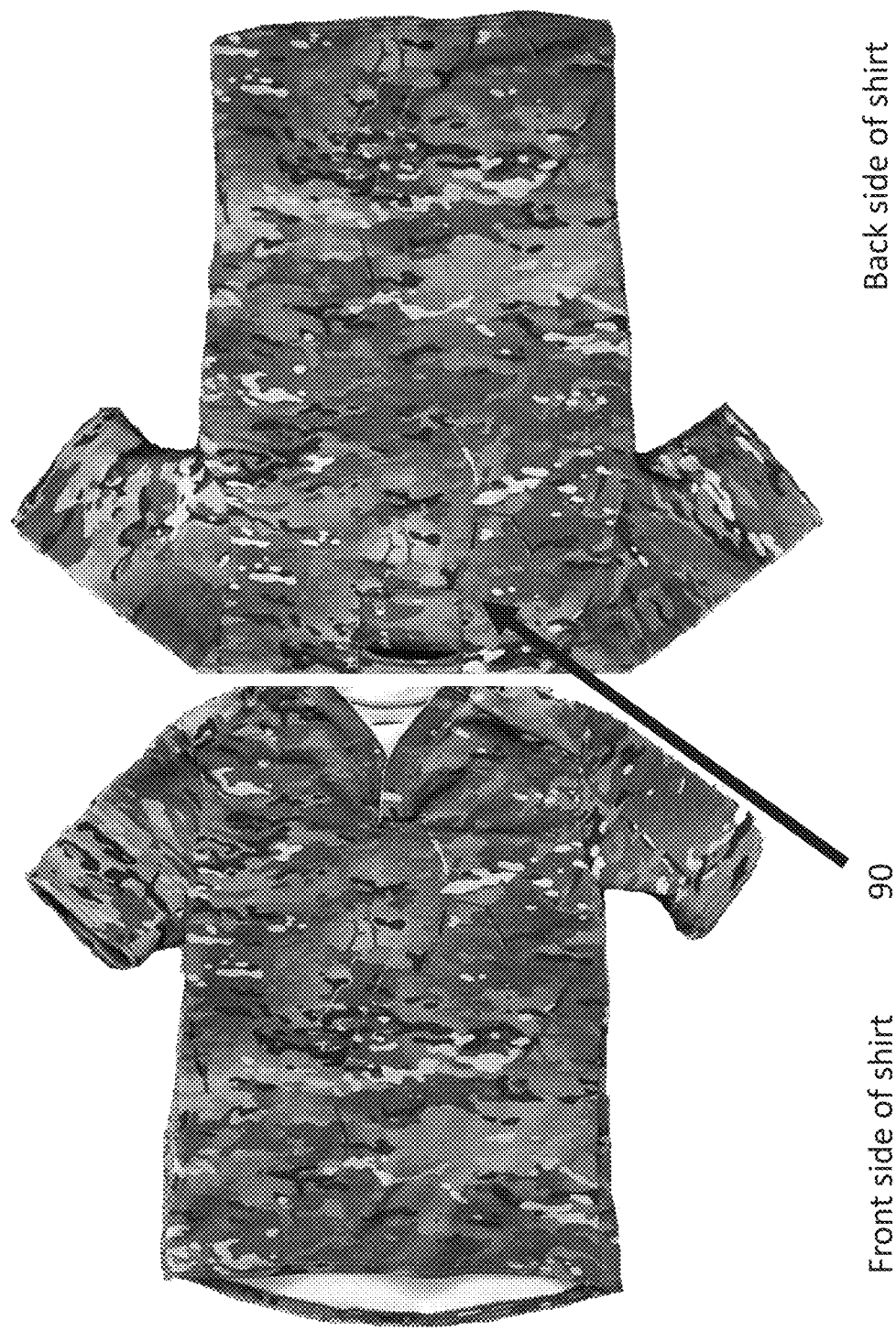

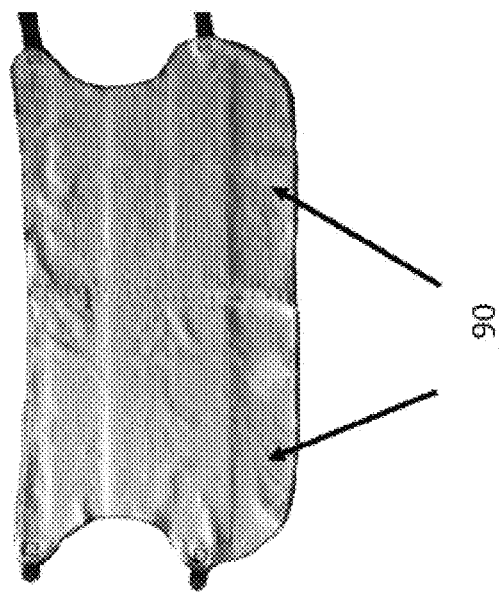
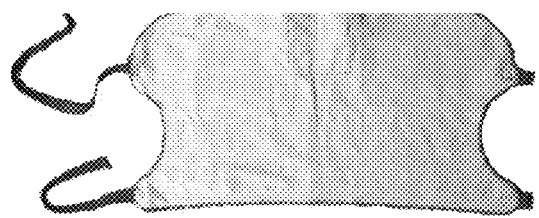
FIG. 34C
FIG. 34B
FIG. 34A

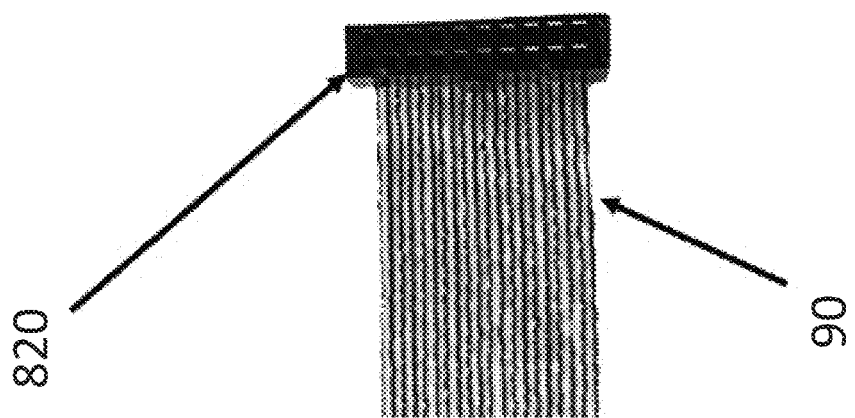
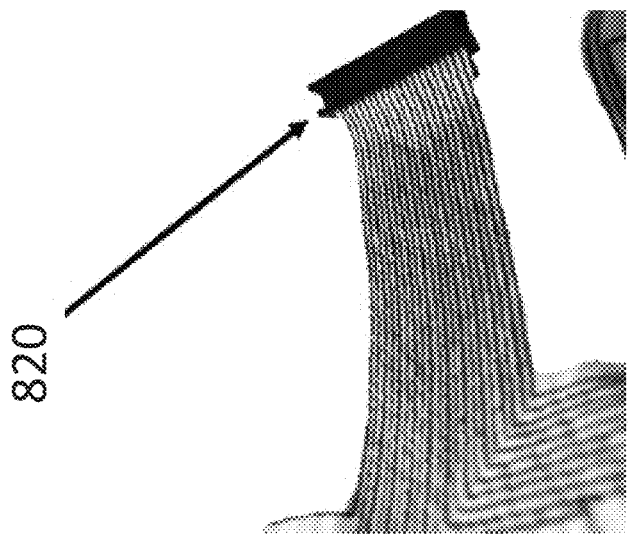
FIG. 38A
FIG. 38B

SENSORS FOR WEARABLE DEVICES

BACKGROUND OF THE INVENTION

Hemorrhage from vascular injuries in the proximal extremities, pelvis, and abdomen is extremely difficult to triage in the field outside of medical facilities. While the treatment of such injuries is challenging when they occur in civilian populations, they are even more difficult to treat in combat situations. While improvements in body armor have reduced mortality from combat injuries to the chest, the incidence of penetrating injuries to the extremities and their associated mortality remain high. Wearable devices have been developed to protect a person from and/or treat injuries sustained in combat situations. However, when the person is injured, the appropriate parties are not always promptly notified of the injury or the nature of the injury. The time between injury and proper care is a critical window that can significantly affect the outcome. If the window is too long, the person may die. Accordingly, new sensor technologies are needed that can be incorporated into wearable devices and other equipment (e.g., vehicles) in order to relay critical information to a person wearing the device or operating the equipment, as well as to third party responders, such as medical professionals.

SUMMARY OF THE INVENTION

Featured is an impact detection sensor including a nonconductive layer disposed between two conductive layers. Each conductive layer may include an electrical circuit configured to generate a signal in response to an impact. The sensor may be configured to generate the signal upon breakage of the electrical circuit following the impact.

The nonconductive layer may be a fabric, such as a cloth or garment (e.g., shirt, pants, or hat). The conductive layers may include conductive ink. The conductive ink may be imprinted on or within the nonconductive layer. The conductive layers may include conductive thread. The conductive thread may be embroidered (e.g., sewn or knit) on or within the nonconductive layer. The conductive thread may be embroidered on the inside (e.g., facing toward a wearer) of the fabric, the outside (e.g., facing away from the wearer) of the fabric, or both. The conductive layers can be patterned, e.g., with an interdigitated pattern or a substantially concentric pattern. The conductive layers may include a conductive metal (e.g., one or more of silver, copper, gold, aluminum, and zinc).

The nonconductive layer may have a thickness from about 0.001 mm to about 100 mm (e.g., 0.01 mm to about 50 mm, e.g., 0.01 mm to about 5 mm, e.g., 0.002 mm, 0.003 mm, 0.004 mm, 0.005 mm, 0.006 mm, 0.007 mm, 0.008 mm, 0.009 mm, 0.01 mm, 0.02 mm, 0.03 mm, 0.04 mm, 0.05 mm, 0.06 mm, 0.07 mm, 0.08 mm, 0.09 mm, 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm).

The circuit may further include one or more set reset latches and/or gates (e.g., AND gates). The circuit may include one or more field-programmable gate arrays (FPGAs).

Also featured is a system including the impact detection sensor of any of the above embodiments and a microcontroller. The electrical circuit may be connected to the microcontroller. The system may further include a counter and a clock connected to the microcontroller. The clock may be configured to calculate a timestamp of the impact to each of the conductive layers. The counter may be configured to count a time between the timestamp of the impact of each of the conductive layers.

The microcontroller, the counter, and the clock may be configured to calculate a velocity of the impact based on the thickness of the nonconductive layer and the time between the timestamp of the impact to each of the conductive layers.

The system may further include a peripheral device configured for wired or wireless (e.g., BLUETOOTH®) connection to the impact detection sensor. The peripheral device may include a graphical user interface (GUI) and one or more processors coupled to the GUI. The GUI may be configured to display one or more metrics related to the impact. The one or more metrics may be selected from the group consisting of velocity, directionality, size, entrance or exit, and mass.

In another aspect, featured is a garment including the impact detection sensor or system of any of the above embodiments. The garment may be a shirt, a vest, a jacket, shorts, bodysuit, pants, a hat, gloves, shoes, or socks. The garment may include a plurality (e.g., 2, 3, 4, 5, 6, 7, 8, 9, 10, 20, 30, 40, 50, 60, 70, 80, 90, 100, or more) of the impact detection sensors. Each impact detection sensor or a set of impact detection sensors may correspond a zone of the garment. Each zone may correspond to an organ (e.g., heart, lung, brain, or other organ, such as kidney, liver, or spleen) or a location (e.g., head, arm, torso, and leg) on a body of a subject wearing the garment or wearable device.

The garment may include a pocket. The pocket may be configured to hold an electronic module (e.g., microcontroller or peripheral device). The electronic module may be configured to connect to a lead of the electrical circuit of the senor. If the garment includes a plurality of sensors, the electronic module may be configured to connect to a plurality of the leads of the electrical circuits. The pocket may be positioned near the back of a neck of a wearer.

In another aspect, featured is a wearable device including the impact detection sensor, system, or garment of any of the above embodiments. The wearable device may include one or more (e.g., 2, 3, 4, 5, 6, 7, 8, 9, 10, 20, 30, 40, 50, 60, 70, 80, 90, 100, or more) inflatable bladders. The one or more inflatable bladders may be configured to inflate upon a signal generated by the impact detection sensor. The one or more inflatable bladders may be configured to expand (e.g., by 10%, 20%, 30%, 40%, 50%, 60%, 70%, 80%, 90%, 100%, 200%, 300%, 400%, 500%, 600%, 700%, 800%, 900%, 1000%, or more) during inflation, thereby producing a pressure (e.g., at least 2 psi, e.g., from about 2 psi to about 50 psi, e.g., from about 5.8 psi to about 19.3 psi) that reduces fluid (e.g., blood) loss at the site of the impact.

In some embodiments of the garment and/or wearable device as described herein, a conductive thread is embroidered on the front of the wearable device and/or the back of the wearable device (e.g., a garment, such a shirt, vest, jacket, pants, shorts, sleeve, wrap, bodysuit, sock, hat, helmet, glove, shoes, or brace). The conductive thread may be embroidered on the inside of the garment (e.g., facing toward the wearer), the outside of the garment (e.g., facing away from the wearer), or both the inside and outside. In this embodiment, the nonconductive layer may be, e.g., the body of the wearer.

Also featured is a method of detecting an impact using the impact detection sensor of any one of the above embodiments. The method may include generating a signal upon breakage of the electrical circuit produced by the conductive layers.

The impact detection sensor may be connected to an FPGA, microcontroller, a clock, and/or a counter. The method may further include calculating a timestamp of the impact to each of the conductive layers. The method may further include calculating a time between the timestamp of the impact of each of the conductive layers. The method may further include calculating a velocity of the impact based on the thickness of the nonconductive layer and the time between the impact to each of the conductive layers. In some embodiments, the method may further include calculating a directionality of the impact based on a location of the impact to each of the conductive layers.

The impact detection sensor may be configured as part of a garment or wearable device including the sensor. The garment or wearable device may include a plurality of the impact detection sensors. Each impact detection sensor may correspond to a zone of the garment. Each zone may correspond to an organ (e.g., heart, lung, and brain) or a location (e.g., head, arm, torso, and leg) on a body of a subject wearing the garment or wearable device.

The garment or wearable device may further include a peripheral device configured for wired or wireless (e.g., BLUETOOTH®) connection to the impact detection sensor. The peripheral device may include a GUI and one or more processors coupled to the GUI. The GUI may be configured to display one or more metrics related to the impact. The one or more metrics may be selected from the group consisting of velocity, directionality, size, entrance or exit wound, mass, location on body, and organ.

The wearable device may further include one or more (e.g., 2, 3, 4, 5, 6, 7, 8, 9, 10, 20, 30, 40, 50, 60, 70, 80, 90, 100, or more) inflatable bladders. The one or more inflatable bladders may be configured to inflate upon a signal generated by the impact detection sensor. The one or more inflatable bladders may be configured to expand during inflation, thereby producing a pressure (e.g., at least 2 psi, e.g., from about 2 psi to about 50 psi, e.g., from about 5.8 to about 19.3 psi) that reduces fluid (e.g., blood) loss at the site of the impact.

BRIEF DESCRIPTION OF THE DRAWINGS

FIGS. 1A-1B are schematic representations of a wearable device that includes sensors or zones of sensors (numbered) detecting an impact. The wearable device as shown has been integrated into a shirt and pants. FIG. 1A shows a front view of the wearable device and FIG. 1B shows a rear view of the wearable device.

FIGS. 3A-3C are schematic representations of sensor 50 that includes nonconductive layer 10 sandwiched between conductive layers 20 and 30. FIG. 3A is a top view of sensor 50, FIG. 3B is a side view of sensor 50, and FIG. 3C is a rear view of sensor 50. Sensor 50 is shown with an interdigitated pattern.

FIGS. 4A-4C are schematic representations of device 100 that includes sensor 50, which includes nonconductive layer 10 sandwiched between conductive layers 20 and 30. Sensor 50 is shown placed on fabric 40. FIG. 4A is a top view of device 100 in which conductive layer 30 is not visible, FIG. 4B is a side view of device 100, and FIG. 4C is a rear view of device 100. Sensor 50 is shown with an interdigitated pattern.

FIG. 8A shows two interconnected sensors 60 and 70 with exposed conductive thread 90 and enclosed conductive thread 90 via embroidery. FIG. 8B shows four sensors 200, 300, 400, and 500 with wires 80 connected to conductive thread 90.

FIG. 12A shows a perspective rear view of the shirt, and FIG. 12B shows a front view of the shirt.

FIG. 23A-23B are photographs showing a front view (FIG. 23A) and rear view (FIG. 23B) of a wearable device that includes a plurality of sensors and pocket 700. The wearable device is shown as a shirt.

FIG. 24 is a plan view of a wearable device with a plurality of sensors arranged, in which each sensor corresponds to a zone on the wearable device (see also FIGS.

1A-1B). The arrow denotes a connection point for all of the leads of conductive thread 90. The front side of the shirt is shown on the left and the rear side of the shirt is shown on the right.

FIG. 25 is an overlay of the shirt of FIGS. 23A-23B and the plan view of FIG. 24 showing the zones of sensors on the shirt and conductive thread 90.

Figure 26B:
Figure 26A:

FIGS. 26A-26B are photographs showing a close-up view of a wearable device having a plurality of sensors embroidered on a wearable device. The wearable device is shown as a shirt. FIG. 26A shows a view of the collar region of the shirt and FIG. 26B shows the body of the shirt.

Figure 27B:
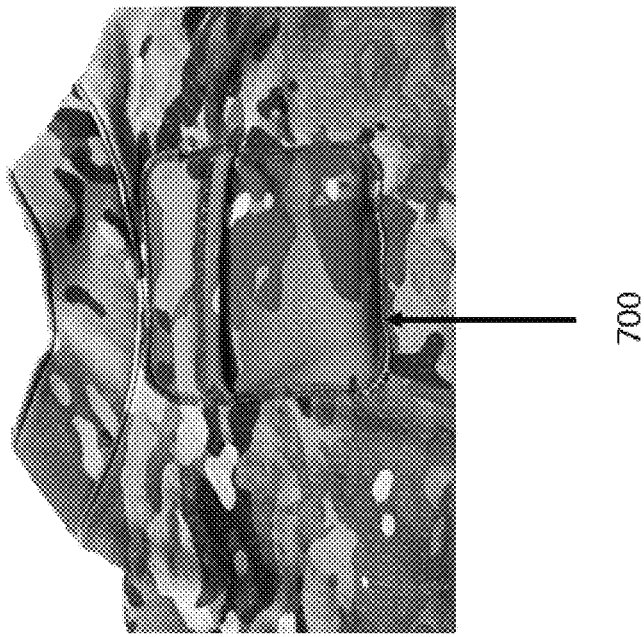
Figure 27A:
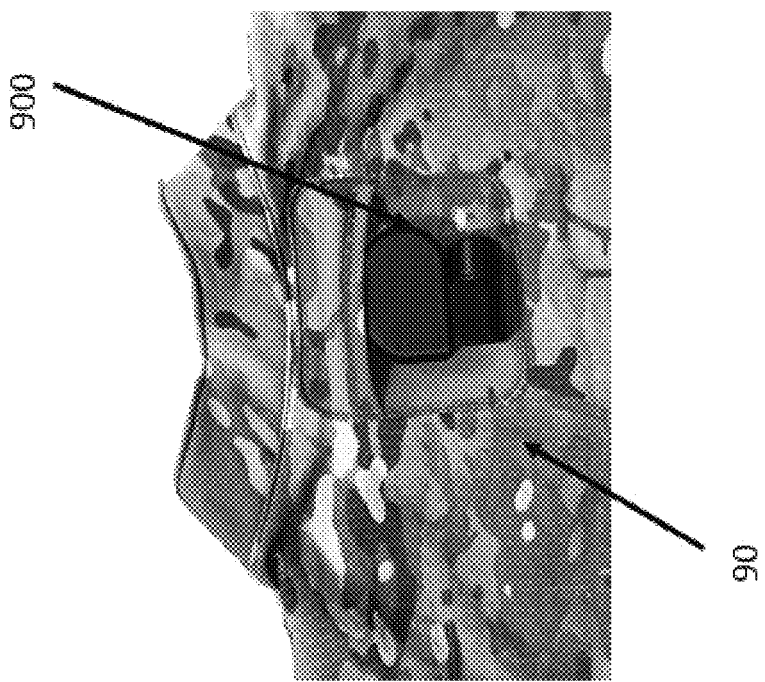

FIGS. 27A-27B are photographs showing a close-up view of pocket 700 on the back of a wearable device having a plurality of sensors embroidered thereon. FIG. 27A shows electronics module 900 in the pocket that connects to the embroidered conductive thread 90 leads at the back of the shirt.

FIG. 27B shows pocket 700 in a closed configuration to secure electronics module 900.

Figure 28:

FIG. 28 is a photograph showing pocket 700 from the inside of the shirt.

Figure 29:
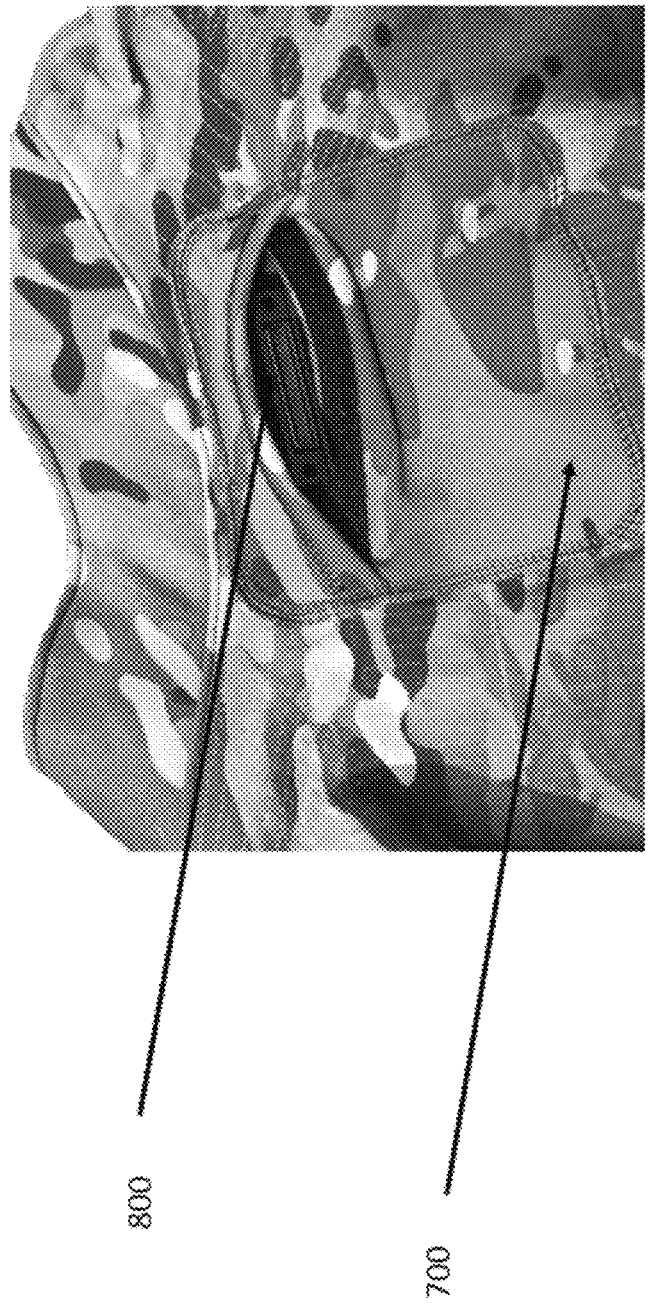

FIG. 29 is a photograph showing pocket 700 and connector 800 that connects the sensors to an electronics module.

Figure 30:

FIG. 30 is a photograph showing connector 800, which can be connected to electronics module 900 and hardwired to a peripheral device (e.g., smartphone) via peripheral device connector 810.

Figure 31B:
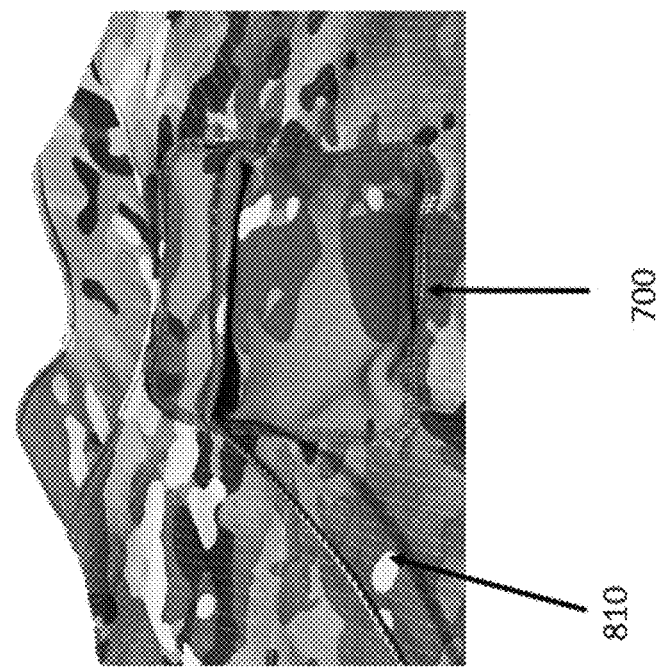
Figure 31A:
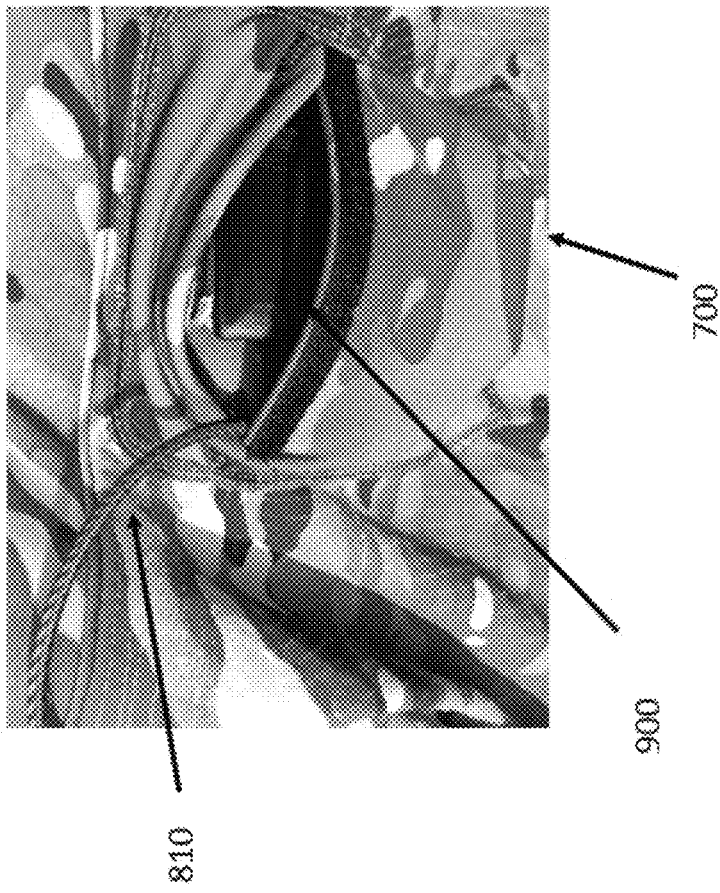

FIGS. 31A-31B are photographs showing electronics module 900 in pocket 700 in an open (FIG. 31A) and closed (FIG. 31B) configuration. Also shown is peripheral device connector 810, which connects to a peripheral device (e.g., smartphone).

Figure 32:

FIG. 32 is a photograph showing ballistic armor (e.g., bulletproof vest) worn over a wearable device as described herein. Pocket 700 is positioned so that the pocket and peripheral device connector 810 can be accessible when ballistic armor is worn over the wearable device.

Figure 33:
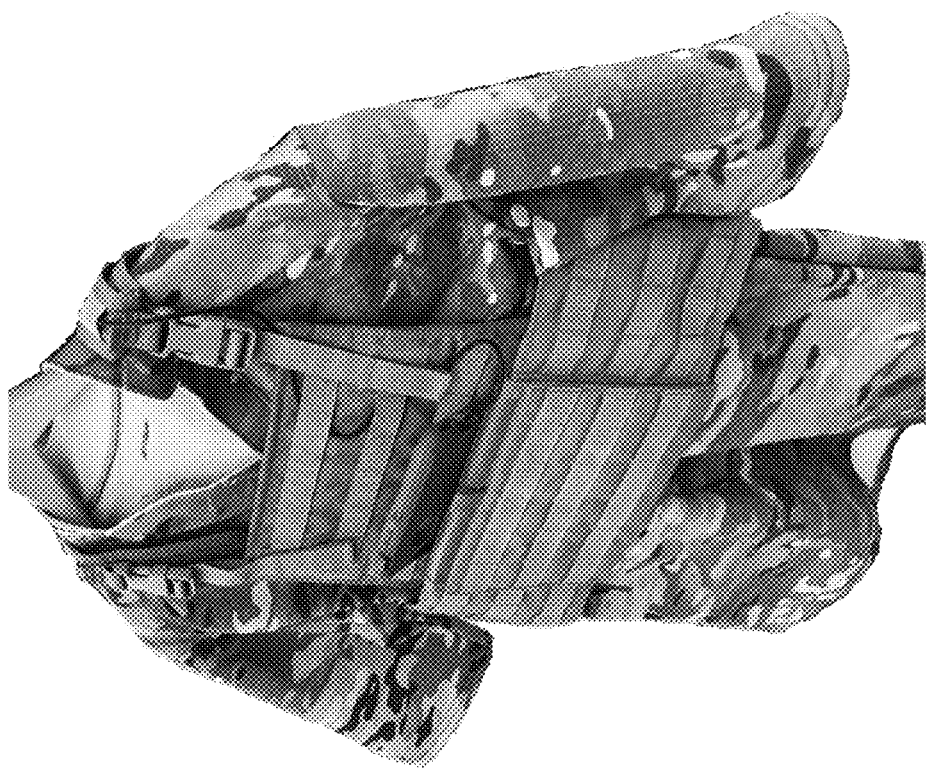

FIG. 33 is a photograph showing ballistic armor (e.g., bulletproof vest) worn over a wearable device as described herein. The ballistic armor has a large pocket in the front for a peripheral device (e.g., tablet), which can be used for communication, e.g., to a third party.

FIGS. 34A-34C are photographs showing a wearable device as described herein configured for use with an animal. FIG. 34A shows the inside and FIG. 34B shows the outside of the wearable device.

FIG. 34C shows a close-up view of the inside of the device showing the embroidered conductive thread 90.

Figure 35:
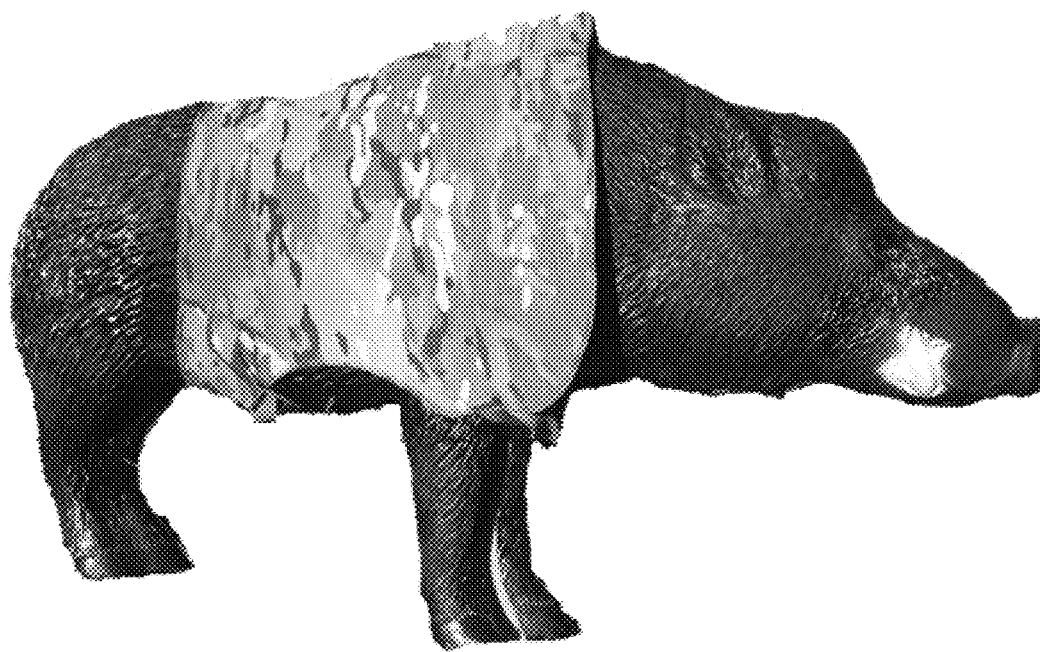

FIG. 35 is a photograph showing a wearable device (e.g., as shown in FIGS. 34A-34C) configured for use with an animal, such as a pig.

Figure 36:
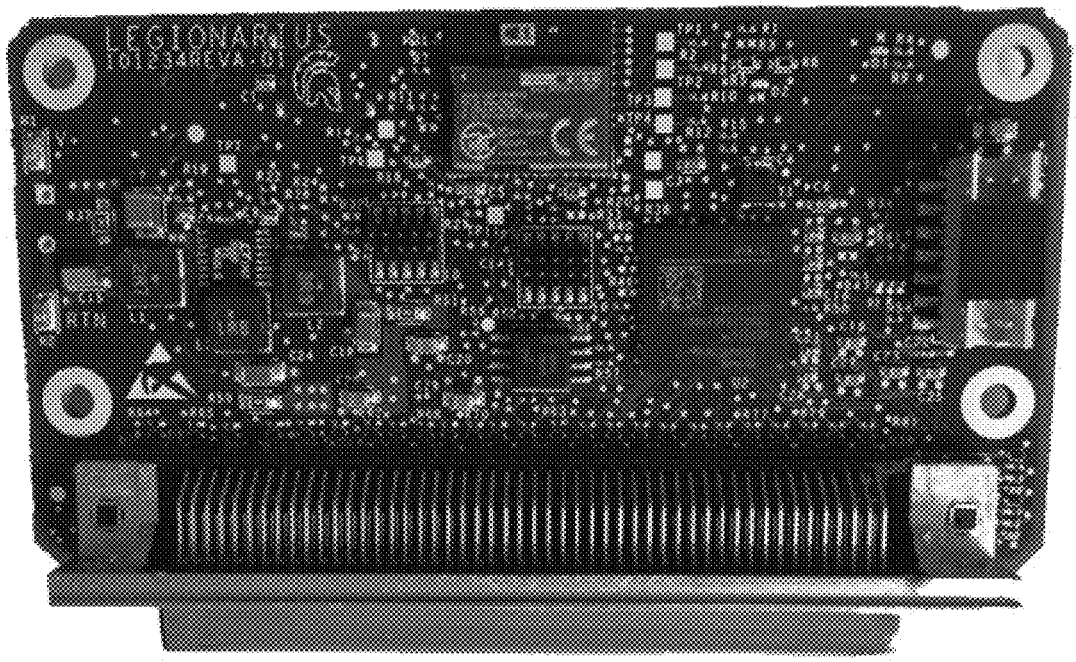

FIG. 36 is a photograph of a circuit that includes a field-programmable gate array (FPGA).

Figure 37B:
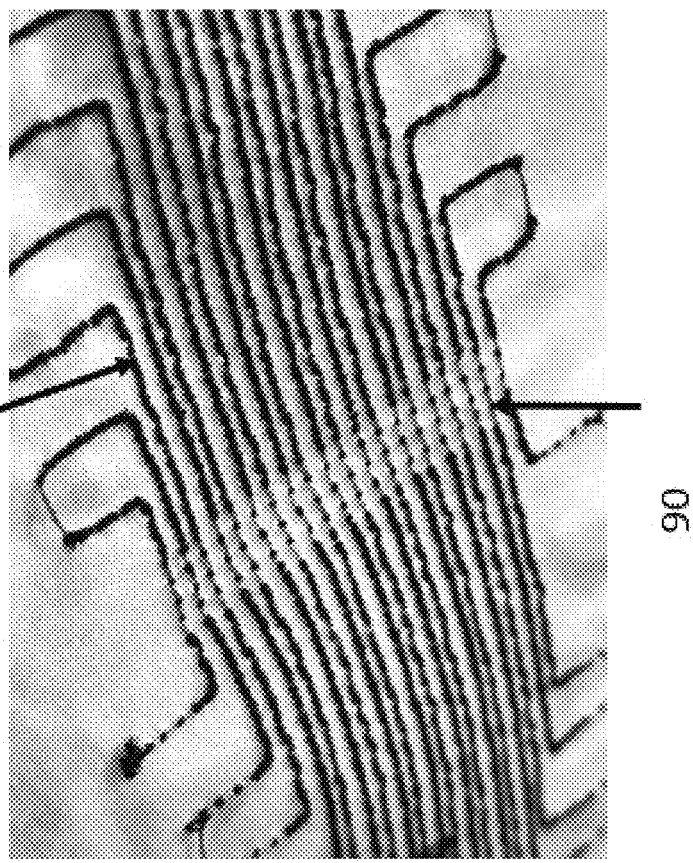
Figure 37A:
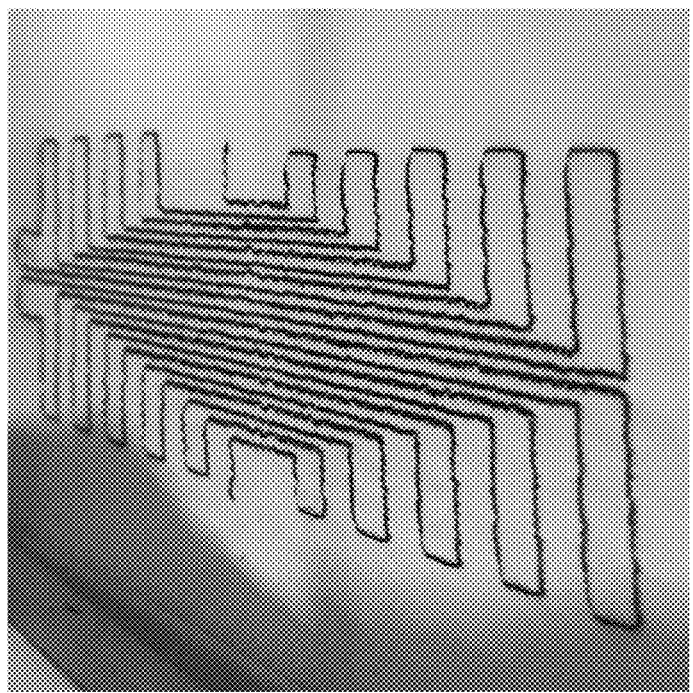

FIGS. 37A-37B are photographs showing enclosed (top arrow) and exposed (bottom arrow) conductive thread 90 that may be used to connect the garment to a digital connector (see, e.g., FIGS. 28 and 29).

FIGS. 38A-38B are photographs showing conductive thread 90 that connects to multi-pin, multi-row connector 820. FIG. 38A shows a front view and FIG. 38B shows a rear view.

Figure 39C:
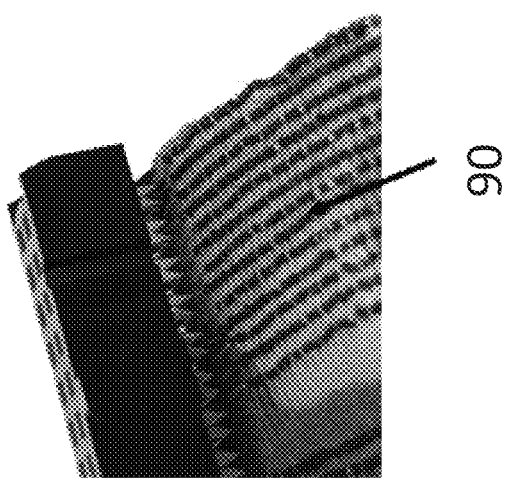
Figure 39B:
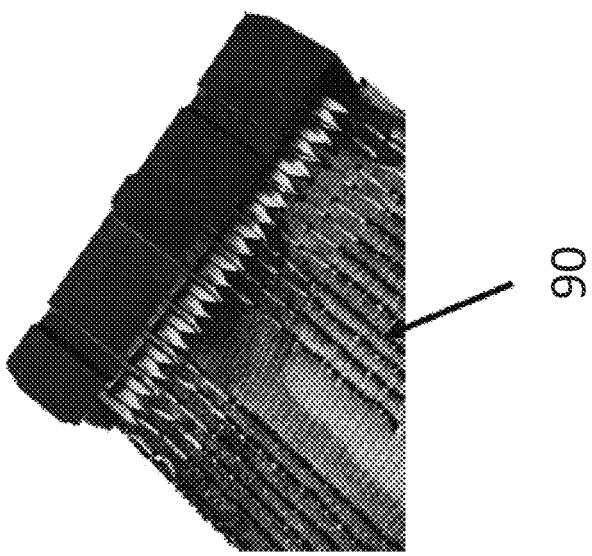
Figure 39A:
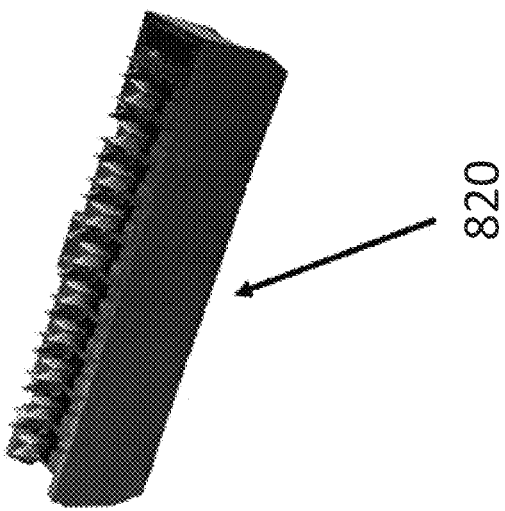

FIGS. 39A-39C are photographs showing multi-pin, multi-row connector 820 that connects to the conductive thread. FIG. 39A shows connector 820. FIG. 39B shows the connector and the conductive thread 90. FIG. 39C shows a view of the connector crimped onto the conductive thread 90.

DETAILED DESCRIPTION

Featured are impact detection sensors including a non-conductive layer disposed between two conductive layers. Each conductive layer includes an electrical circuit configured to generate a signal in response to an impact, e.g., from a bullet or shrapnel. Also featured are devices (e.g., a wearable device, such as a garment, or a device configured for use with equipment, such as a vehicle (e.g., an automobile, tank, or aircraft) or a drone) that include one or more (e.g., 2, 3, 4, 5, 6, 7, 8, 9, 10, 20, 30, 40, 50, 60, 70, 80, 90, 100, or more) sensors on or within the device. Also featured are systems including a peripheral device configured to transmit to and receive input from sensors on the device and computer implemented methods using the devices and systems.

The devices and systems can receive and process data (e.g., impact detection data) from sensors on the device (e.g., the wearable device or device for equipment, e.g., a vehicle). The devices and systems may utilize software (e.g., an application) running on the devices and systems or accessible from the device or system using a wired or wireless interface, e.g., a cloud-based interface, that communicates with the device. Sensor information processed by the application or a device running the application can be used to provide situational awareness for users under a variety of conditions, such as adverse conditions, in particular during combat or wartime. This information can be presented to the user of the device, other team members operating in concert (e.g., on a mission) with the user, or a third party.

In the event that an episode (e.g., an injury, such as a catastrophic injury, for example, a ballistic impact) occurs to the user wearing or operating the device, the sensors present on the device (e.g., wearable device or equipment device, e.g., vehicle device) can instantly detect various indicia related to the details of the episode (e.g., severity of impact, location of impact, direction or source of impact, and details of injury). In combat situations, having directionality information can provide situational awareness regarding the source of an attack or shooter. The device may also be configured, e.g., with additional sensors (e.g., biometric sensors, chemical, biological, radiological, and nuclear (CBRNE) sensors), for monitoring the status of the device (e.g., operational status, e.g., broken or damaged components) or the health status of the user (e.g., physiological indicia and biometric data). The sensor information can be collected, e.g., in real time, and subsequently processed (e.g., by an algorithm e.g., using an application, such as a software application) and displayed to the user (e.g., on a peripheral device worn or operated by the user) or provided to a third party. The peripheral device may be running an application that can process the sensor data into a user-friendly format on a separate device that communicates with the sensors. For example, the sensors may be connected to a transmitter and/or receiver that transmits the raw data from the sensors that is then processed by the application. The application can then render this information on a GUI (e.g., a touch screen GUI). This information can be presented to the user and/or distributed to other relevant parties, such as team members. The information may indicate the nature of the impact and/or the health status of the user. This information may be used by a third party to monitor the status (e.g., health status) of the user or the operational status of the device (e.g., equipment, such as a vehicle) and, when needed, to provide appropriate response or care to treat the user or attend to or repair the equipment (e.g., a vehicle).

The device with one or more sensors may be configured as a wearable device, such as a garment. The wearable device may also include one or more (e.g., 2, 3, 4, 5, 6, 7, 8, 9, 10, or more) bladders. The bladders may be directly or indirectly connected to the sensors, such that activation of a sensor(s) can be used to trigger inflation of a bladder. The bladders may be used for autonomous hemorrhage control to prevent fluid (e.g., blood) loss. For example, if the user wearing the wearable device suffers an episode (e.g., an injury, such as a catastrophic injury, for example, a ballistic impact), the sensors on the wearable device can detect (e.g., in real time) information about the episode, such as the velocity of the ballistic impact and the location and nature of the injury (e.g., torso or leg, e.g., entrance or exit wound). A transmitter and/or receiver on the wearable device can process the information about the impact and can transmit a signal that triggers inflation of the bladders at or near the site of the injury. Inflation of the bladders causes the bladders to expand and apply pressure on the wound thereby preventing or reducing fluid (e.g., blood) loss (e.g., hemorrhage). This feature provides an automated injury response in the event that the injured user cannot care for himself and/or a third party responder or team member is too far away to timely apply pressure to the wound.

The device may be applied to or integrated with an inanimate object, such as a vehicle (e.g., car, truck, plane, helicopter, boat, motorcycle, and drone) or a piece of equipment (e.g., backpack, barrel, and canister). The device may include sensors, such as impact detection sensors, that provide situational awareness regarding the functional status of the device or equipment. For example, if configured for a vehicle and the vehicle experiences an impact (e.g., from a ballistic weapon), the sensors on the device may collect data regarding the impact (e.g., direction of impact, force of impact, and location of impact). These data may then be used to alert the operator of the vehicle or a team member (e.g., third party responder) that the vehicle has an issue (e.g., broken or damaged component, flat tire, or armor defect).

The devices, systems, and methods described herein can be used to present data (e.g., physiological data) regarding the health state of a subject or operational status of equipment or a device (e.g., a vehicle), which can be accessed, controlled, or monitored with the assistance of an application (e.g., software) running on a peripheral device or accessible by a peripheral device (e.g., using wireless or cloud-based access). The subject may be wearing a garment with a device that includes one or more sensors (e.g., impact detection sensors and/or biometric sensors, e.g., as described in more detail below) located on or within the garment. The device of the garment can be configured with transmitters and receivers that can communicate the sensor data to the peripheral device. The application running on the peripheral device can present data to the user directly or the peripheral device may have one or more processors that can convert the data from the sensors into a different format (e.g., easier to review and/or manipulate). The application may operate on a peripheral device with a graphical user interface (GUI). The GUI may be a touch-screen GUI. The device may include one or more processors coupled to the GUI and a memory storing instructions that, when executed by the one or more processors, causes the one or more processors to perform specific operations. The processors may be configured to acquire the physiological data from one or more sensors located within or on the wearable device and to display the physiological data on the GUI.

The sensors and components of the devices and systems described herein, such as impact detection sensors, circuits, a peripheral device configured to run or access an application, a GUI, an information processing unit, a wearable device, equipment or a device configured for use with an inanimate object (e.g., vehicle), and additional sensors (e.g., biometric sensors), are described in more detail below. These sensors, devices, and systems may also be used with the computer implemented methods also described in more detail below.

Impact Detection Sensors

Figure 2:
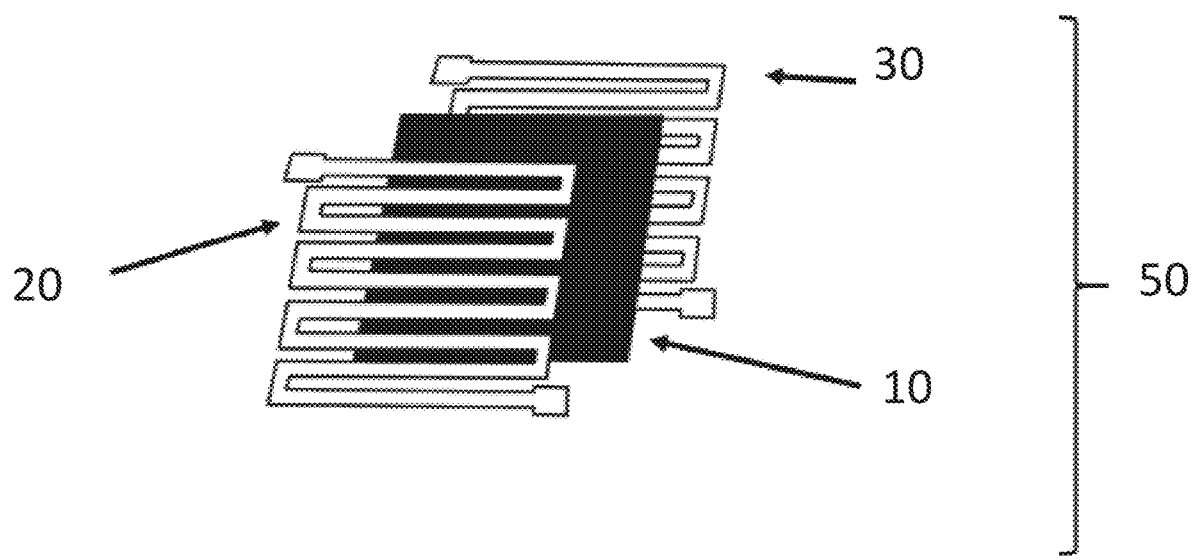
FIG. 2 is a schematic representation of sensor 50 that includes nonconductive layer 10 sandwiched between conductive layers 20 and 30. The sensor is shown with an interdigitated pattern.

The sensors (e.g., impact detection sensors) described herein include a nonconductive layer disposed between two conductive layers (FIG. 2). Each conductive layer may include an electrical circuit configured to generate a signal in response to an impact. For example, the signal may be generated when the impact breaks the electrical circuit.

The nonconductive layer may be a fabric (e.g., a cloth or a garment). The conductive layers may include conductive ink, e.g., that is imprinted on or within the nonconductive layer. The conductive layers may include conductive thread, e.g., that is embroidered sewn, or knit on or within the nonconductive layer. The conductive layers may include a conductive metal, such as silver, copper, gold, aluminum, or zinc. The conductive layer may include a pattern, such as an interdigitated pattern or a substantially concentric (e.g., concentric circles, concentric squares, spiral) pattern.

The nonconductive layer may have any thickness suitable to provide a spacing between the two conductive layers. For example, the nonconductive layer may have a thickness that ranges from 0.001 mm to about 100 mm (e.g., 0.01 mm to about 50 mm, e.g., 0.01 mm to about 5 mm, e.g., 0.002 mm, 0.003 mm, 0.004 mm, 0.005 mm, 0.006 mm, 0.007 mm, 0.008 mm, 0.009 mm, 0.01 mm, 0.02 mm, 0.03 mm, 0.04 mm, 0.05 mm, 0.06 mm, 0.07 mm, 0.08 mm, 0.09 mm, 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm).

The materials of the conductive layers and nonconductive layer may be chosen to suit a particular purpose. For example, a material with high tensile or low tensile strength may be used, such that the circuit breaks at different pressure or force thresholds.

The sensor may be imprinted, embroidered, sewn, and/or knit on a fabric (e.g., a cloth or a garment). The sensor may include, e.g., three layers (e.g., the two conductive layers and the nonconductive layer). The three layers may be arranged such that the nonconductive layer is the fabric (e.g., cloth or garment; FIGS. 3A-3C). Alternatively, the three layers may be placed, e.g., on top of or below the fabric (e.g., cloth or garment), such that the sensor may be separable from the fabric (FIGS. 4A-4C and 10). The conductive thread may be embroidered on the inside of the fabric (e.g., facing toward a wearer), the outside of the fabric (e.g., facing away from the wearer), or both.

Figure 5:
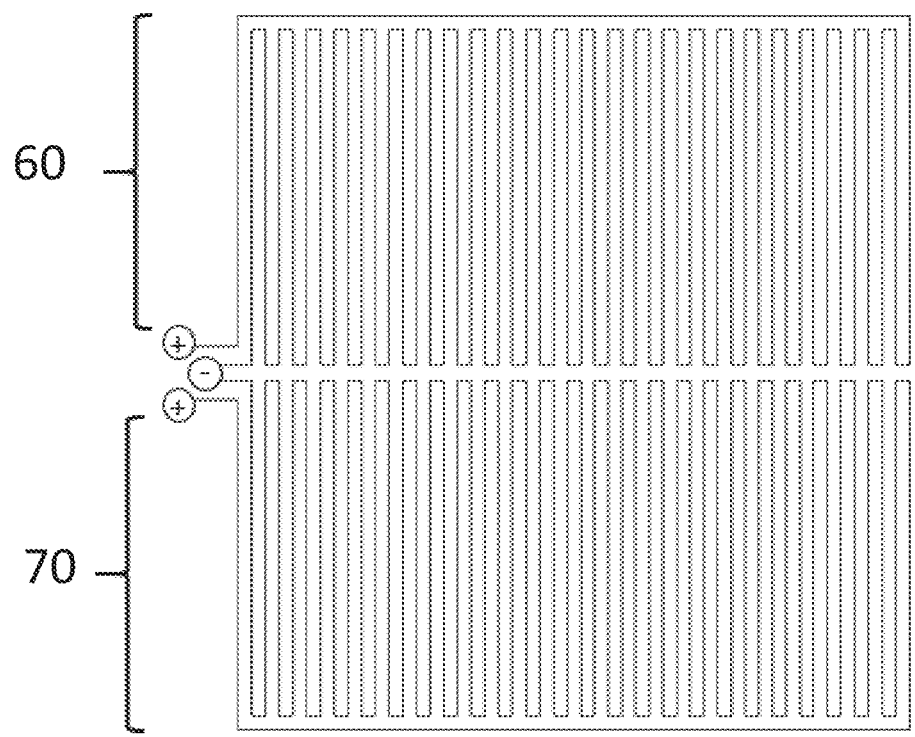
FIG. 5 is a schematic representation showing two interconnected sensors 60 and 70 shown with interdigitated patterns.
Figure 6:
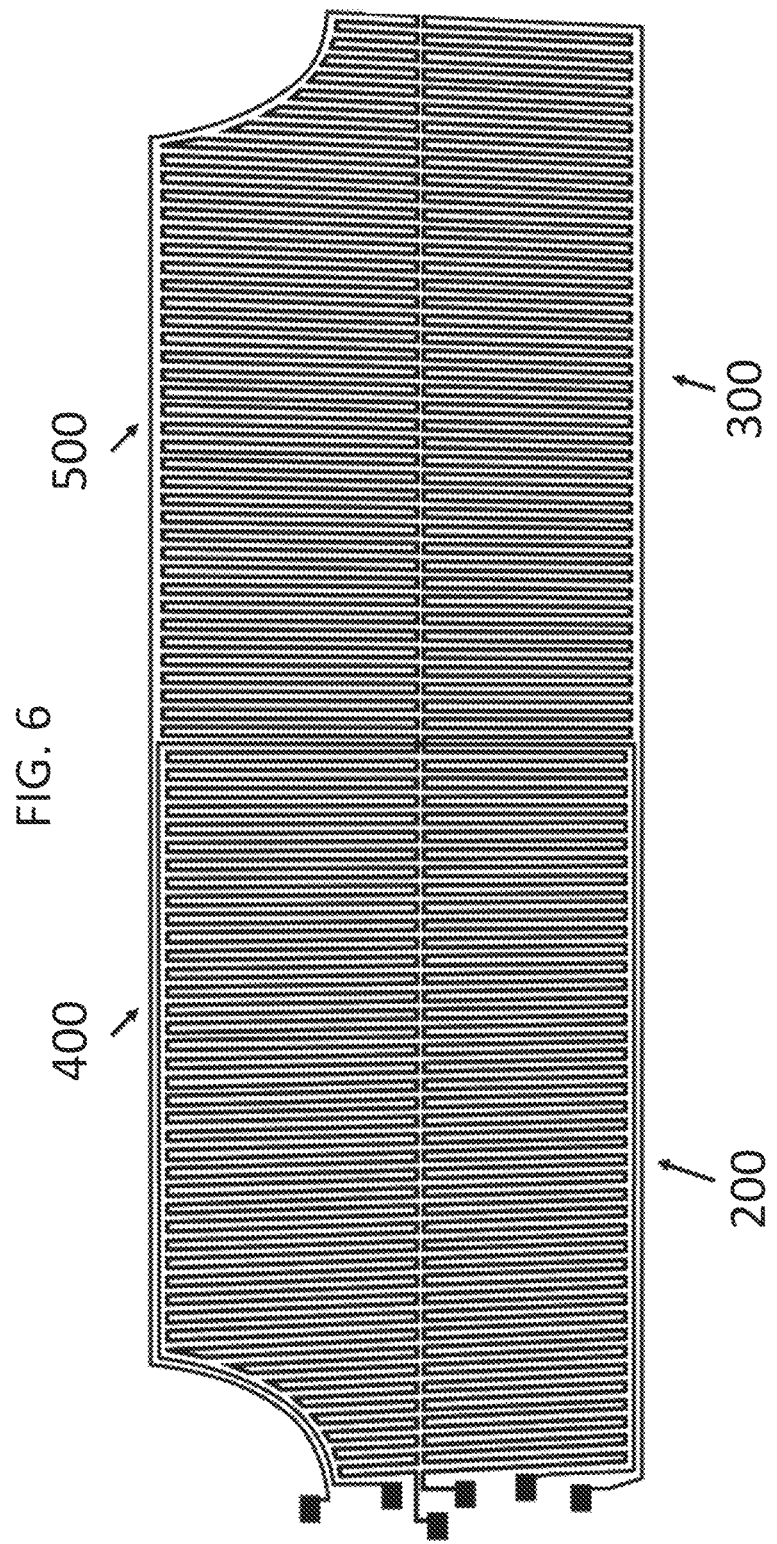
FIG. 6 is a schematic representation showing four interconnected sensors 200, 300, 400, and 500 shown with interdigitated patterns.
Figure 7B:
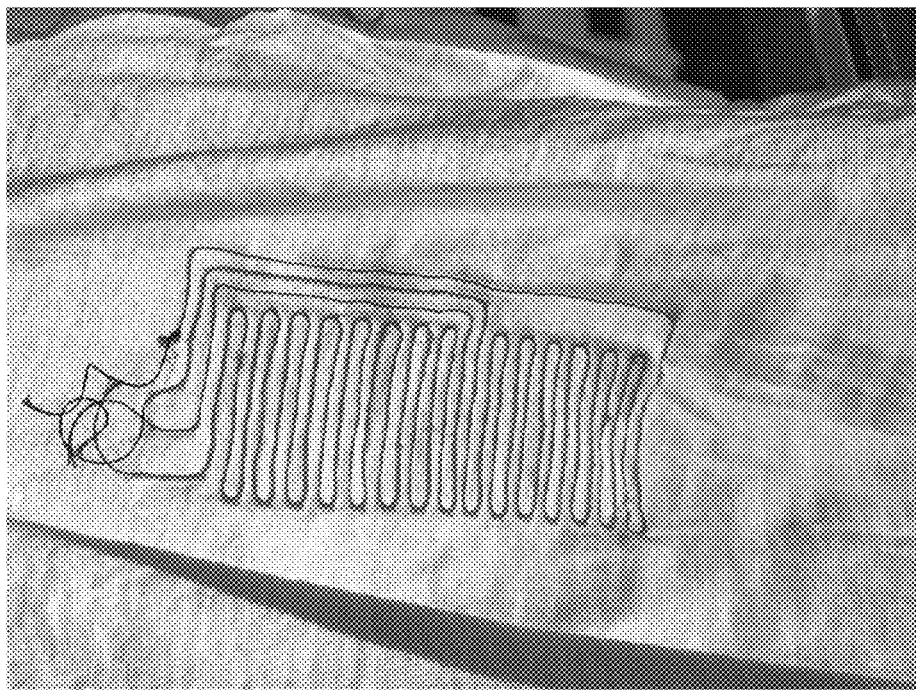
FIGS. 7A-7B are photographs showing conductive layers of a sensor embroidered on a fabric. Two adjacent sensors 60 and 70 are shown with interdigitated patterns.
Figure 7A:
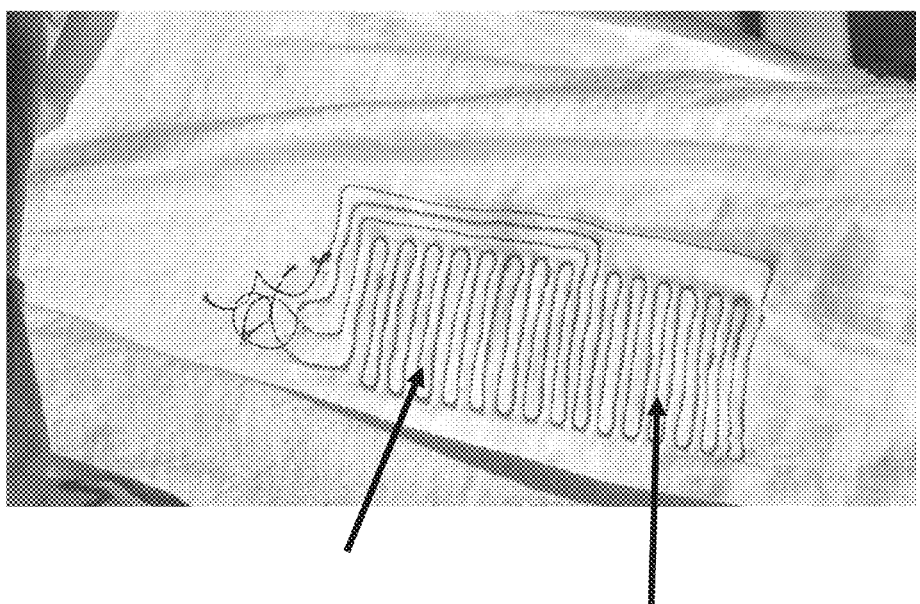
Figure 8B:
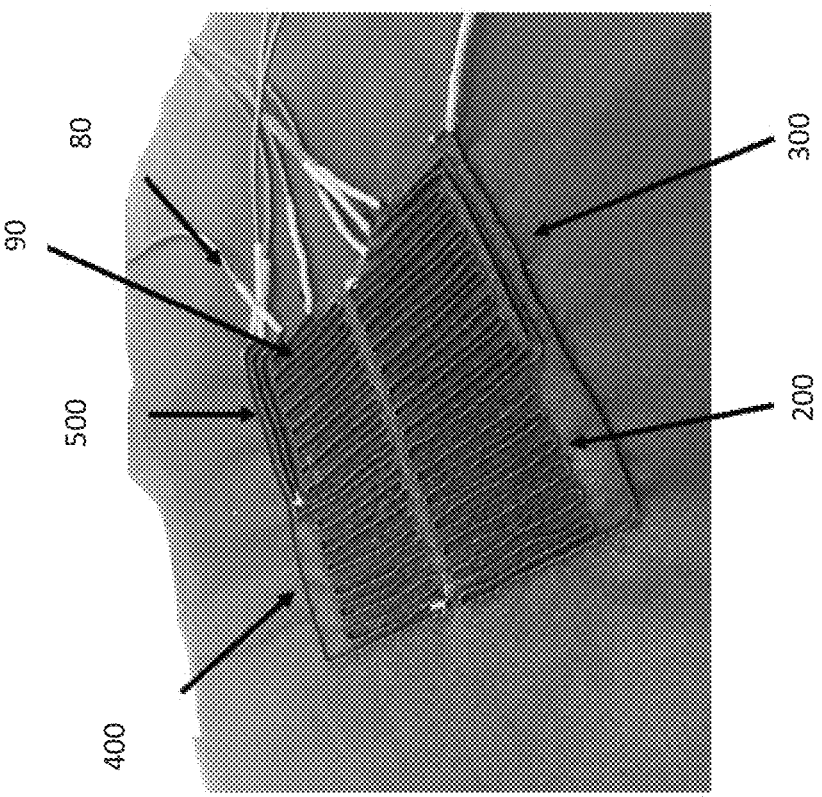
FIGS. 8A-8B are photographs showing conductive layers of a sensor embroidered on a fabric.
Figure 8A:
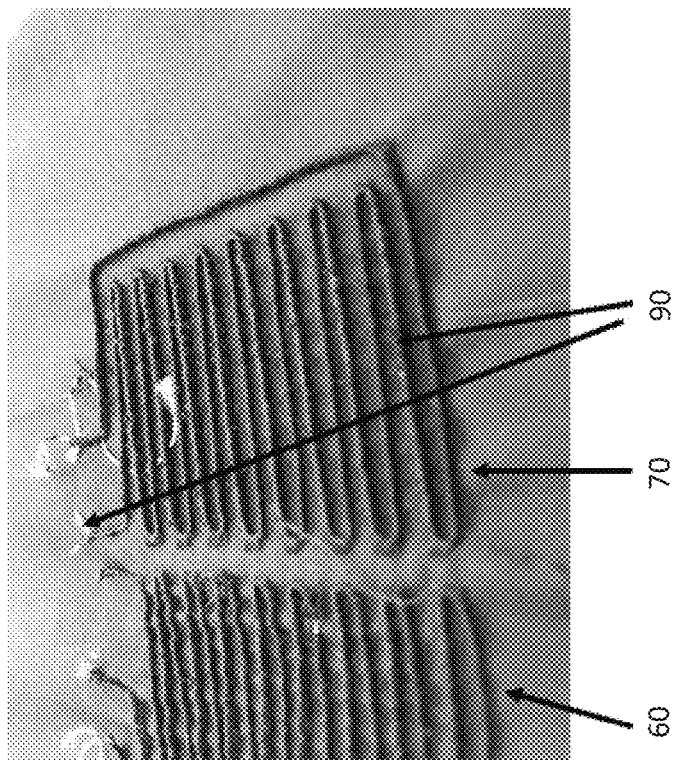
Figure 9:
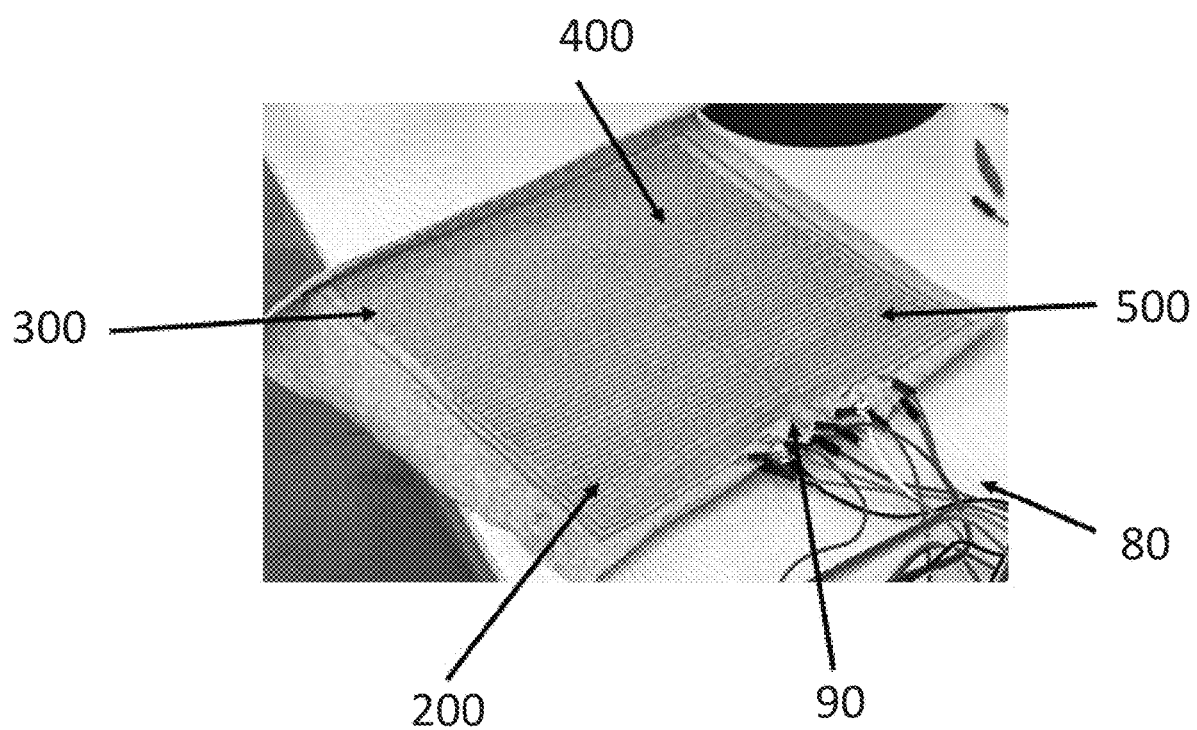
FIG. 9 is a photograph showing four sensors 200, 300, 400, and 500 printed on a fabric with wires 80 connected to conductive thread 90. The sensors are shown with an interdigitated pattern.
Figure 10:
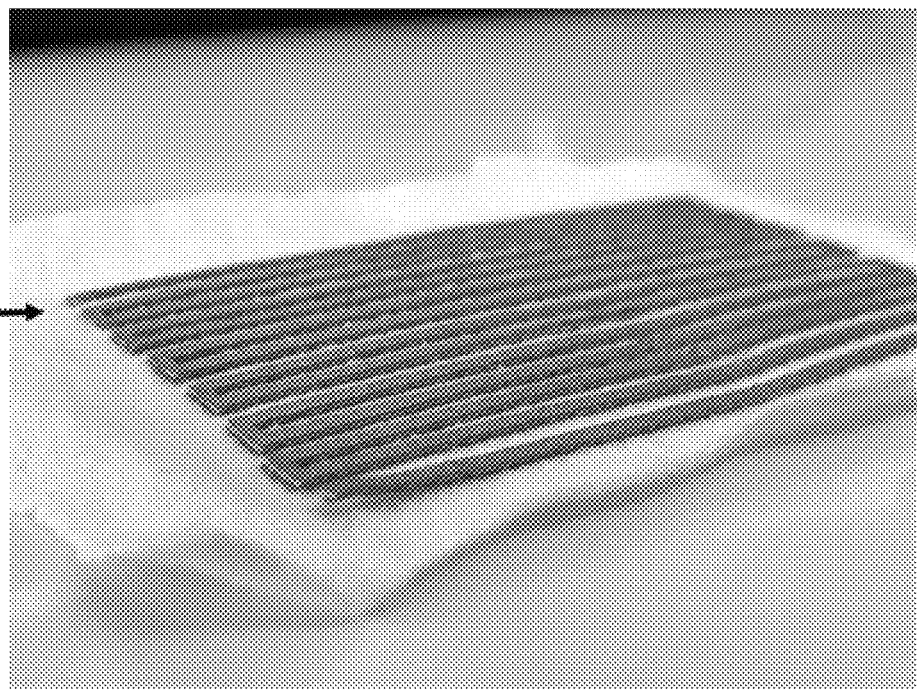
FIG. 10 is a photograph showing sensor 50 that includes a nonconductive spacing sandwiched between two conductive layers. The sensor is shown placed on a fabric (see also FIGS. 4A-4C).
Figure 11:
FIG. 11 is a photograph showing a plurality of multi-layered sensors printed on a cloth.
Figure 19:
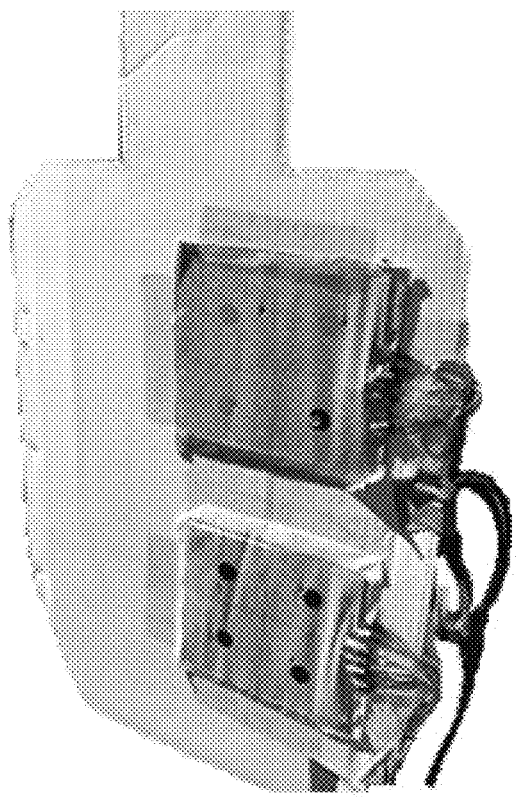
FIG. 19 is photograph showing two sided sensors mounted on displays for testing with projectiles.

A device (e.g., a fabric, such as a cloth or garment, e.g., shirt, pants, and hat) may include more than one (e.g., 2, 3, 4, 5, 6, 7, 8, 9, 10, 20, 30, 40, 50, 60, 70, 80, 90, 100, or more) sensor (FIGS. 5, 6, and 11). The conductive layers may be patterned such that a first sensor is adjacent to a second sensor (FIG. 5) or may be patterned with multiple sensors arranged adjacently, e.g., in a repeating two-dimensional pattern. FIG. 6 shows an example in which four sensors are arranged in a square pattern. As each conductive layer includes a circuit, the electrical leads, e.g., of the conductive thread or ink, may be positioned, e.g., at a single locus (see, e.g., left side of FIGS. 5 and 6 and top of FIGS. 7A and 7B; FIGS. 19 and 24). An interdigitated pattern or substantially concentric pattern in a fabric with multiple sensors allows the multiple leads to be located at a single locus. This affords convenient connection for large networks of sensors by localizing the leads to a single connection point or a few connection points. FIG. 8A shows exposed conductive thread of a pair of sensors, and FIG. 8B shows exposed conductive thread connected by wires on one side of the set of four sensors. FIG. 9 shows four sensors (e.g., copper wire imprinted on a nonconductive layer) arranged in a square pattern in which the leads of the four sensors are connected to wires at a single locus.

In some embodiments, the sensors may be arranged on the nonconductive layer such that a plurality of sensors share a nonconductive layer. Alternatively, the sensors may be arranged such that each sensor has its own nonconductive layer and/or each sensor is positioned on top of a fabric (e.g., cloth or garment, such as a shirt, pants, or hat).

Figure 12B:
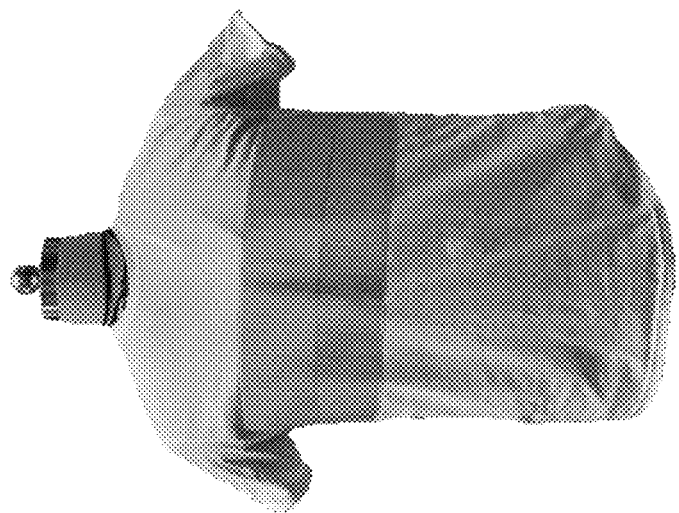
FIGS. 12A-12B are photographs showing a plurality of multi-layered sensors printed on a shirt.
Figure 12A:
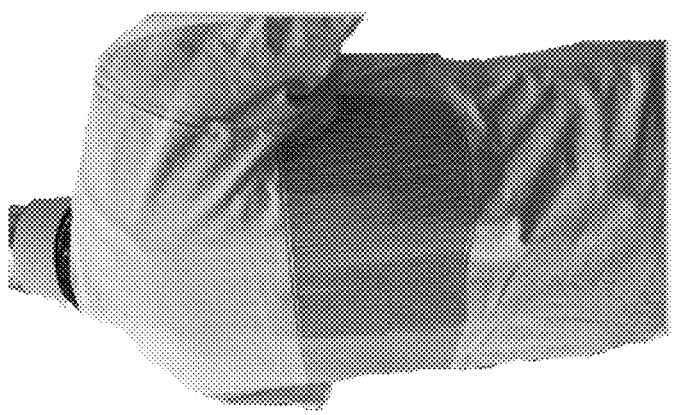
Figure 13:
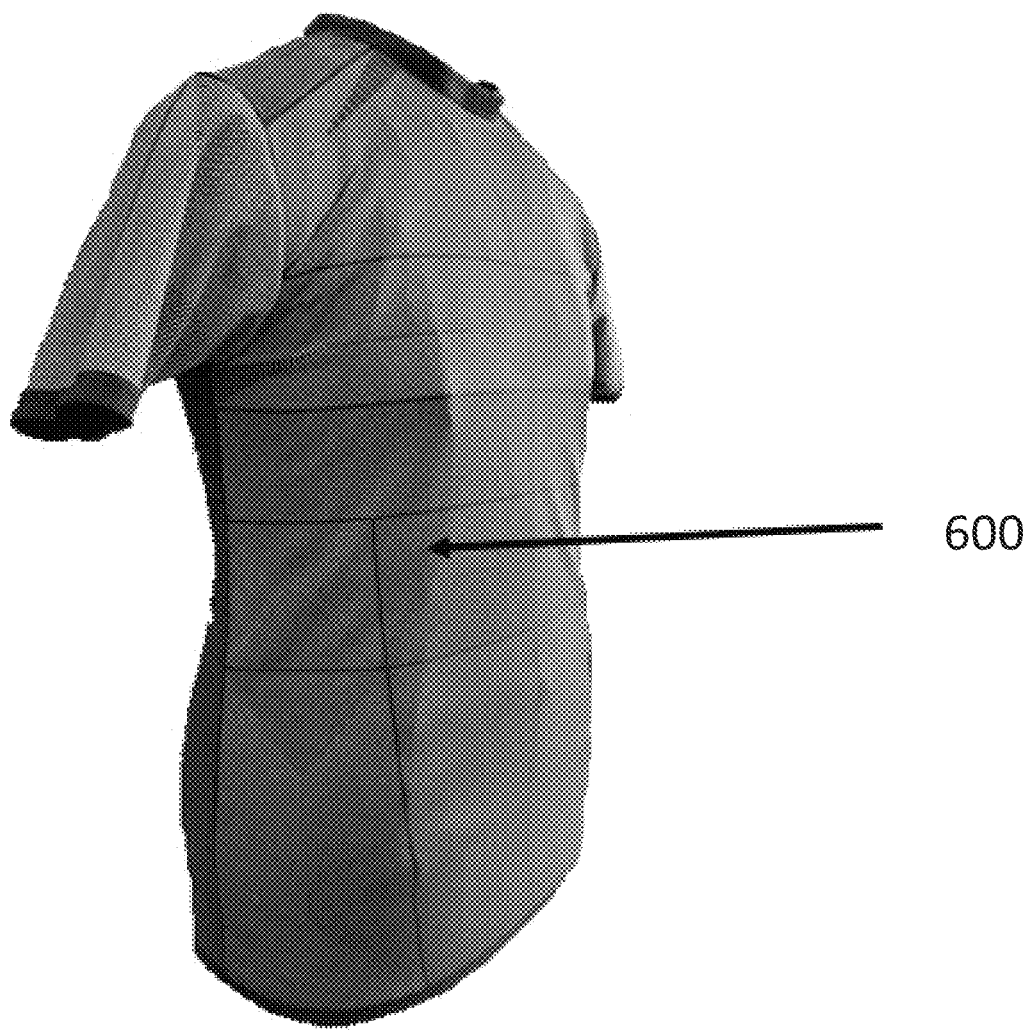
FIG. 13 is a photograph showing multiple zones of sensors delineated by lines 600 with a plurality of multi-layered sensors covering the entire shirt.

Furthermore, the sensors may be patterned on the nonconductive layer to minimize gaps between separate conductive layers (e.g., sensor border). When the sensors are arranged in this manner, e.g., on a garment, such as a shirt or pants, each sensor or group of sensors may correspond to a zone or region on the garment (FIGS. 1A, 1B, 13, 24, and 25). Therefore, every region, or substantially every region, can be covered by at least one sensor. Each zone or region may correspond to a particular organ, such as a vital organ (e.g., heart, lungs, and brain), or a location (e.g., head, arm, torso, and leg) on a body of a subject wearing the garment or wearable device. FIGS. 12A-12B show an embodiment in which the sensors are integrated into a shirt. In this embodiment, the chest region and a region of the back contains the sensors.

In some embodiments of the wearable device, a conductive thread is embroidered on the front of the wearable device and/or the back of the wearable device (e.g., a garment, such a shirt, vest, jacket, pants, shorts, sleeve, wrap, bodysuit, sock, hat, helmet, glove, shoes, or brace). The conductive thread may be embroidered on the inside of the garment (e.g., facing toward the wearer), the outside of the garment (e.g., facing away from the wearer), or both the inside and outside. In this embodiment, the nonconductive layer may be, e.g., the body of the wearer (FIGS. 26A-26B). In this embodiment, a calculation such as velocity and directionality may only be obtainable if the wearer experiences an entrance and exit wound.

Circuit and Microcontroller

Figure 14:
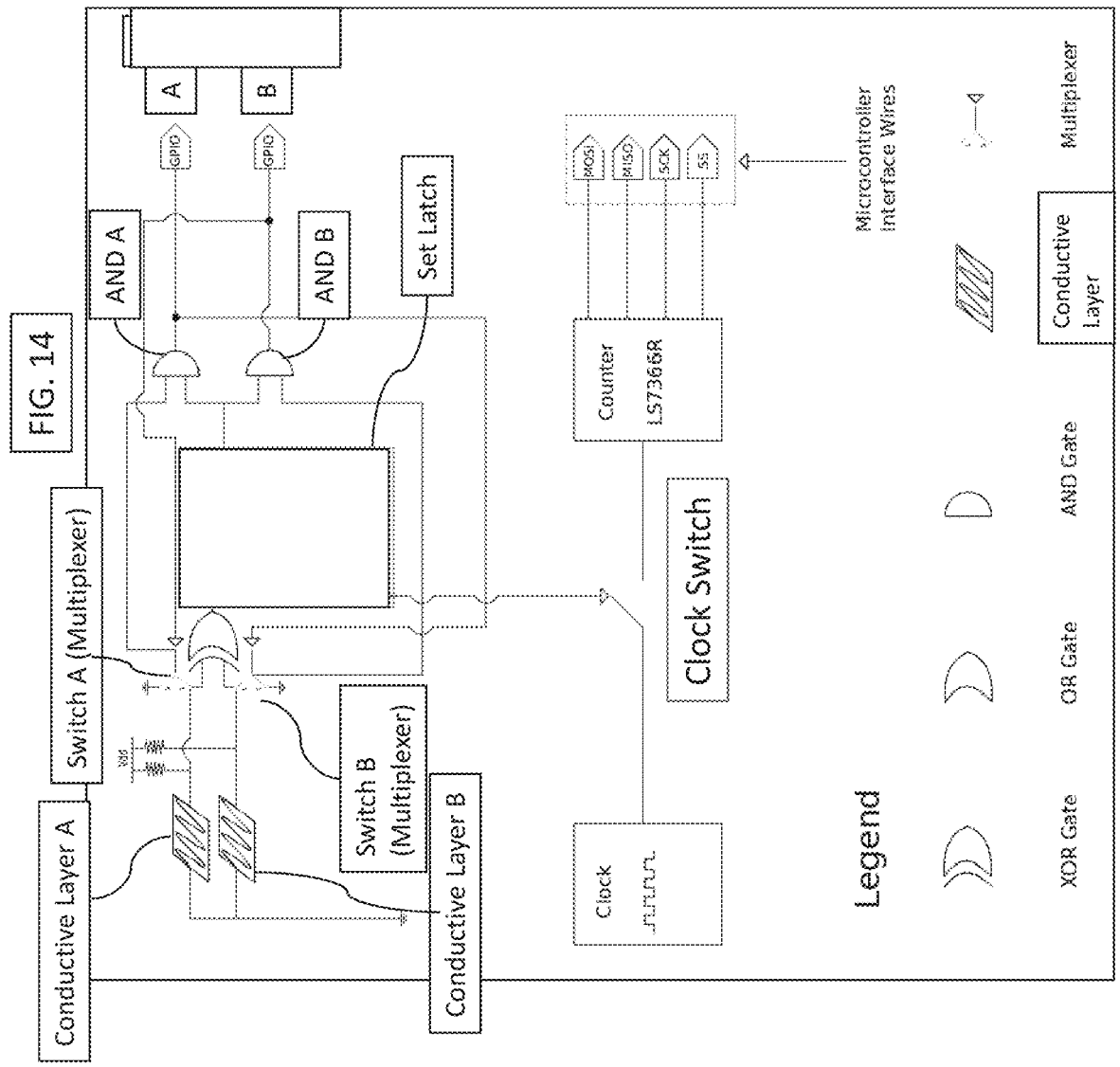
FIG. 14 is a schematic representation of a digital circuit that can be used with a sensor. A multi-layered sensor contains two sandwiched conductive layers (Conductive Layers A and B), which are shown connected to a digital circuit, which is shown connected to a microcontroller.
Figure 15:
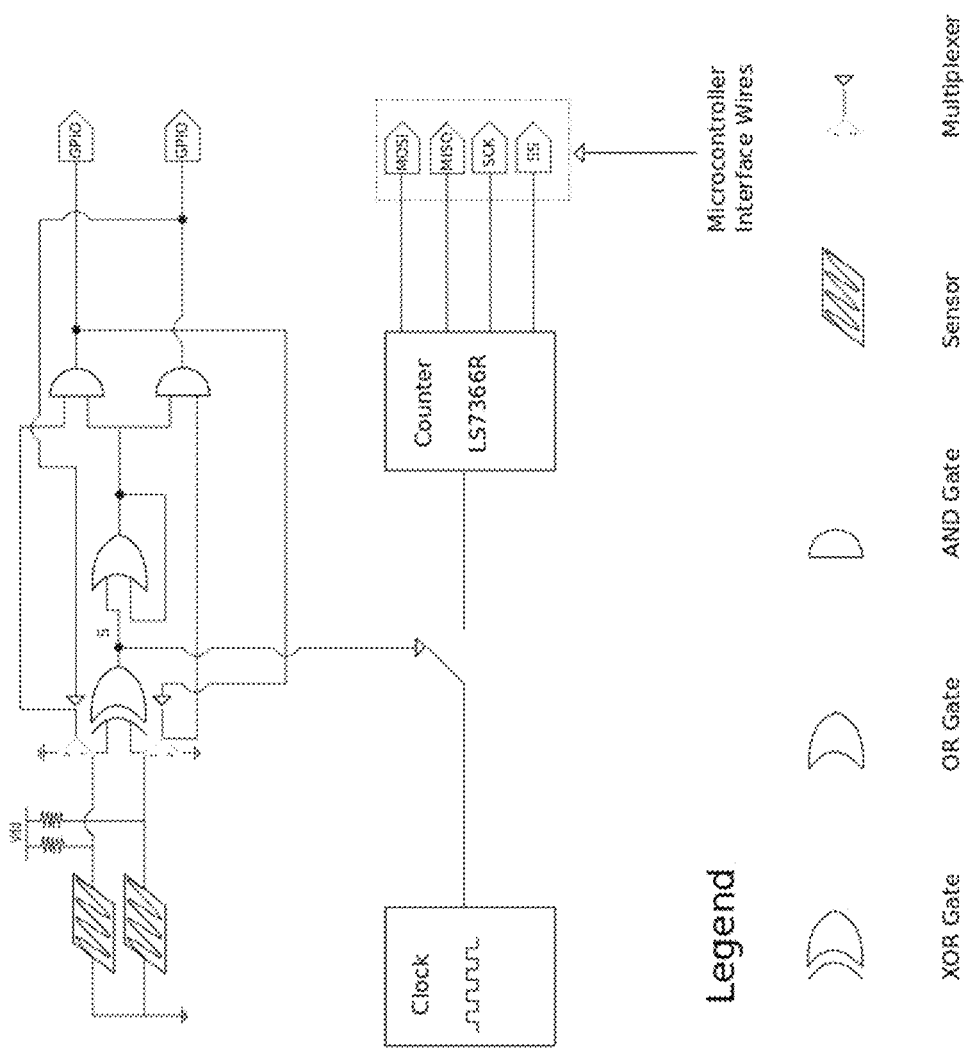
FIG. 15 is a schematic representation of a digital circuit that can be used with a sensor.

The sensors described herein may form an electrical circuit that is configured to generate a signal in response to an impact. The circuit may be connected to a microcontroller. For example, when a ballistic projectile (e.g., bullet or shrapnel) impacts the sensor, the electrical circuit may be broken, thereby generating a signal upon impact. Exemplary circuits that can be used with the sensors described herein is shown in FIGS. 14 and 15. The circuit may include one or more set/reset latches. The circuit may include one or more gates (e.g., AND gates). The circuit may include or be connected to a clock and/or a counter. The clock may be configured to calculate a timestamp of impact of each conductive layer. The counter may be configured to count a time between the timestamp of impact of each conductive layer. The difference between the timestamps is the time it takes the impact to pass through the nonconductive layer. The microcontroller may be connected to the circuit. The microcontroller may be connected, e.g., to the clock and/or the counter.

The circuit may include one or more field-programmable gate arrays (FPGAs) (FIG. 36). The circuit may include a pull-up resistor connected to a circuit, such as a low voltage complementary metal oxide semiconductor (LVCMOS) circuit. A pull-up resistor circuit includes a conductive thread that is grounded at one end and connected to a resistor at the other end. When the circuit breaks (e.g., from an impact), the ground connection is removed and the resistor raises the voltage (e.g., to 3.3 V) of the circuit to generate a signal.

Figure 16:
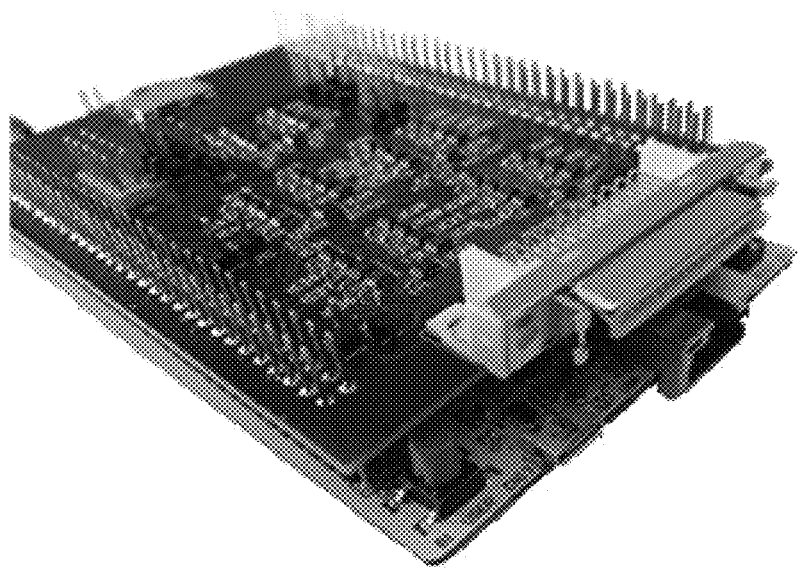
FIG. 16 is a photograph of a printed circuit board (PCB) configured for use with a sensor. The PCB includes a digital circuit, a microcontroller, and a BLUETOOTH® transmitter.

An exemplary printed circuit board (PCB) configured for use with a sensor is shown in FIG. 16. The PCB includes a digital circuit, a microcontroller, and a BLUETOOTH® transmitter/receiver.

The microcontroller can perform computational functions, such as calculating the difference between the timestamps of the impact of each conductive layer upon impact. Furthermore, as the nonconductive layer has a known thickness, a velocity of the impact can be calculated based on the time between the impact of each conductive layer and the distance traveled between the conductive layers (e.g., the thickness of the nonconductive layer). A free running counter can be running in the FPGA. The instantaneous counter value can be latched when a sensor detects an impact. Projectile velocity may be calculated from the difference between the latched timer values from detected impacts of the inner and outer conductive layers, along with a priori knowledge of the thickness of the non-conductive layer.

When the sensors are arranged, e.g., on a garment, the garment may have sensors positioned on both the front and rear sides of the garment (e.g., chest and back). Each sensor includes two conductive layers, and, therefore, the front and rear side sensors include, for example, four conductive layers. This multi layered sensor (or set of sensors) provides the ability to determine more complex indicia related to the nature of an impact. For example, if an impact breaks the circuit of all four conductive layers, it can be determined that a user wearing the garment may have an entrance and an exit wound. However, if the impact only breaks one or two circuits (e.g., from a front side sensor), then the subject may only have an entrance wound. The sensors may be arranged in a polar manner, such that it can be detected (e.g., in conjunction with a timestamp) whether the entrance or exit wound is on the front (e.g., chest) or rear (e.g., back), thus providing information about the directionality of the impact. Additionally, if the impact contacts the sensor at an angle displaced from the normal of the sensor surface, the relative positions where the circuit breaks on the front or rear side of the sensor can provide information as to the source or origin of the impacting projectile. Furthermore, if the circuit breaks on all four conductive layers, the relative positions of the entrance and exit wound can also provide additional information as to the directionality of the impact.

As is shown in FIG. 14, a digital circuit can be used with a sensor as described herein. The sensor includes two conductive layers (e.g., Layer A and Layer B), which are connected to the digital circuit, which in turn is connected to a microcontroller. As soon as the first conductive layer (e.g., Layer A) breaks during an impact, the XOR Gate can trigger the Set Latch. The Set Latch can then activate one input of both AND gate A and B ("AND A", "AND B"). AND gate A can receive its second input via Multiplexer "Switch A". AND gate A is activated, as both of its inputs are now set to HIGH, which sends a signal to general purpose input output (GPIO) A, the input of the microcontroller. In this example, AND gate B does not get activated because switch B is toggled to ground permanently by the output of AND gate A. Depending on which layer is broken first during the impact, the device can calculate whether the impact resulted in an entrance wound only or entrance and exit wounds. The circuit also allows for calculation of the impact velocity. When the first layer receives an impact (e.g., Layer A), a counter chip (e.g., LS7366R) can start to count time pulses. Once the second layer is penetrated (e.g., Layer B), the counter can stop the process. Since the thickness of the nonconductive layer (e.g., the fabric of a shirt) is known, the device can use these data to calculate a velocity. The microcontroller may constantly scan for the circuit data so that it can process and map the data to the location on the body where the impact occurred. The microcontroller can also communicate with the chip that counts time pulses so that it can retrieve the time data and compute the velocity of a projectile. The entry/exit data can be combined with the velocity data and then sent to a BLUETOOTH® chip that communicates the data to a peripheral device, e.g., a mobile device, such as a smart phone or tablet, running an application that can present the data to a user.

Figure 20:
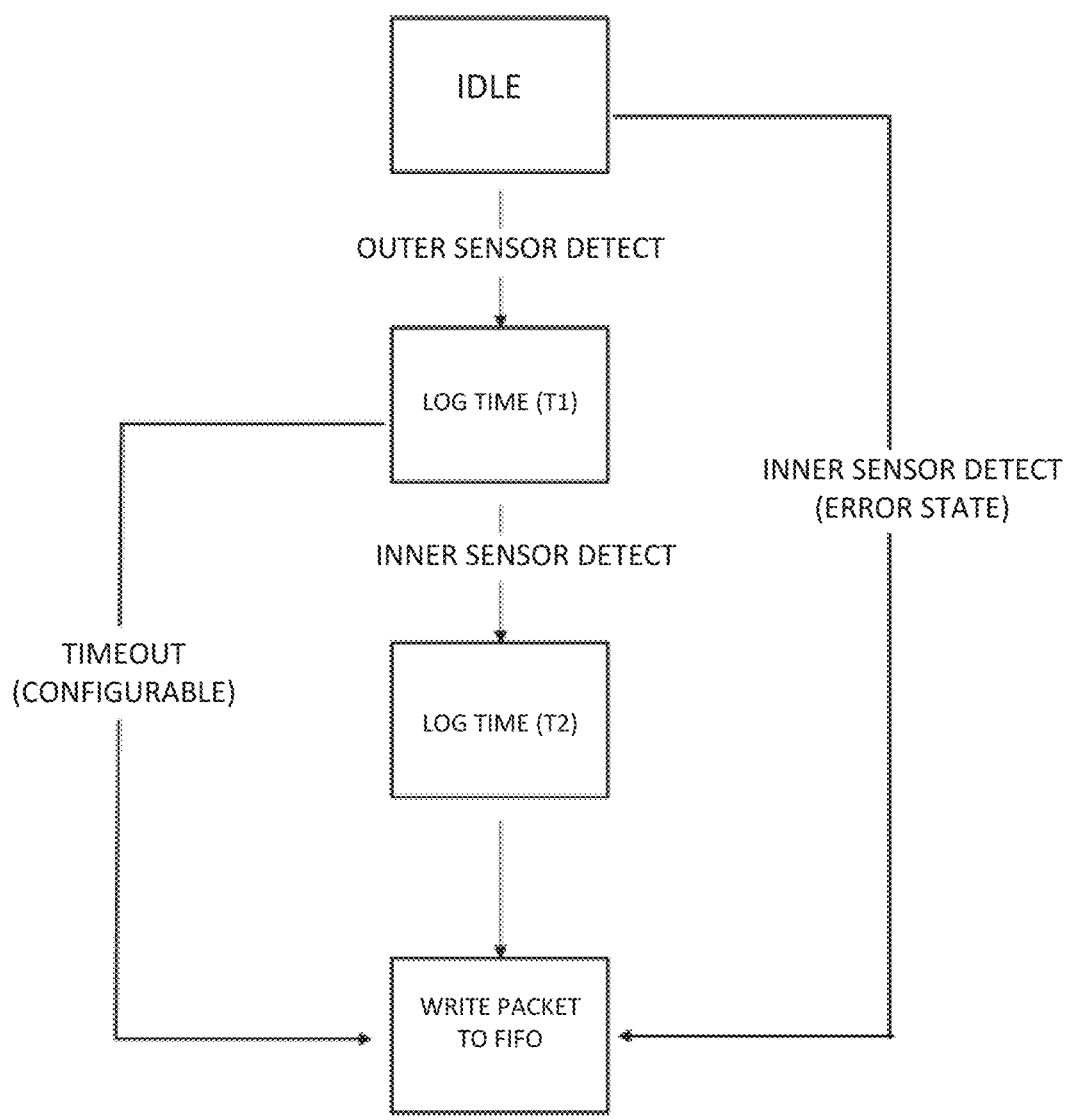
FIG. 20 is a schematic diagram showing a logic diagram for a circuit of a dual-sided sensor as described herein.

A logic diagram for detecting an impact by a dual-sided sensor is shown in FIG. 20. In this diagram, three possible outcomes exist, an error state, a timeout, or a normal impact. When the inner sensor detects an impact before the outer sensor, the circuit triggers an error state. When the outer sensor detects an impact but a long time passes and the inner sensor does not detect an impact, the microcontroller signals a timeout. The length of time can be modified based a desired value. A high velocity impact is expected to break both layers of the sensor, so when either the inner layer does not break or the inner layer breaks first, both outcomes may signal an anomaly. The third outcome is a detection of the outer layer breaking followed by the inner layer breaking. The time at which each circuit breaks is logged (e.g., T1 and T2) and can be written to an output, e.g., first in first out (FIFO).

Figure 21:
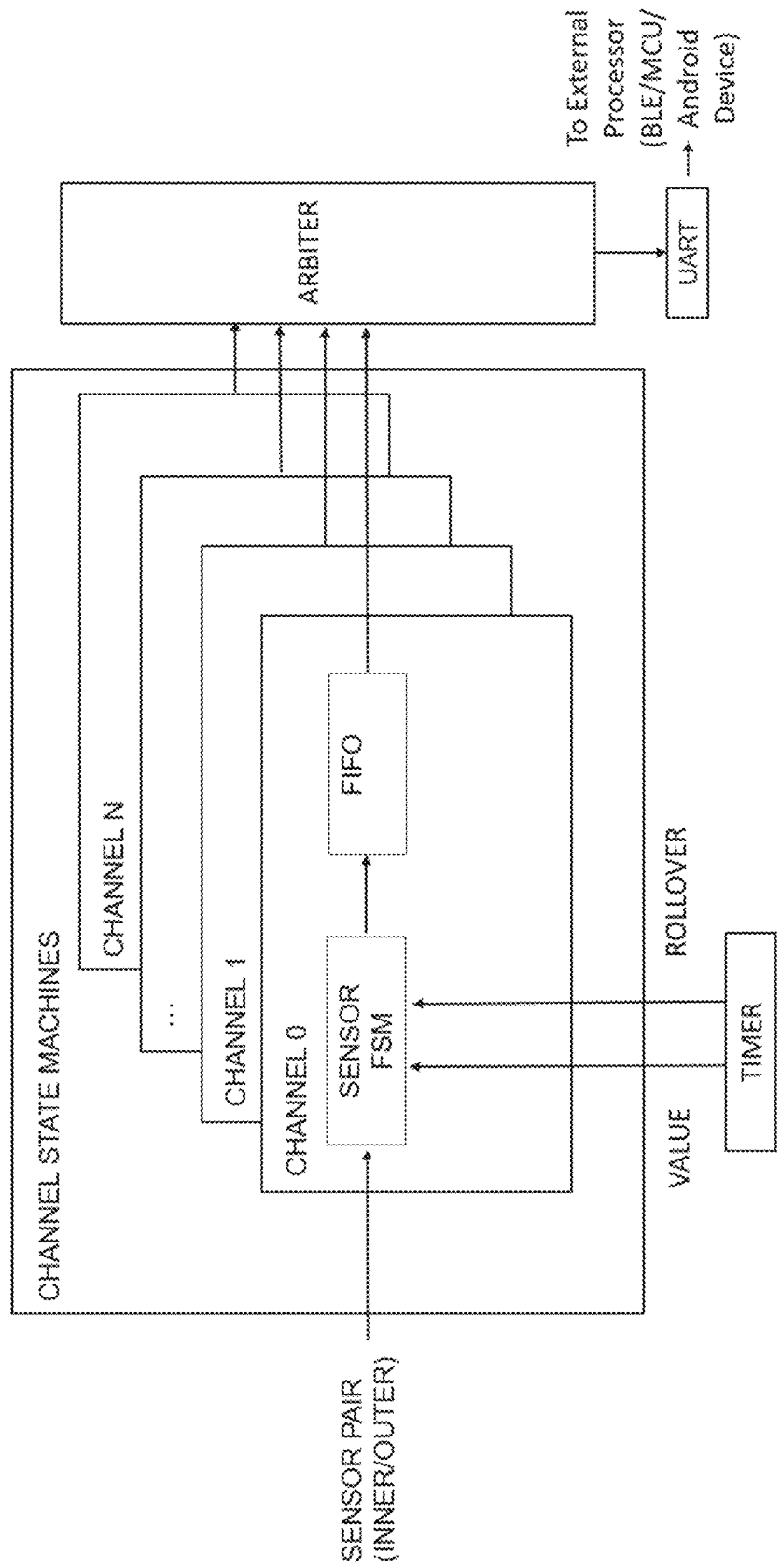
FIG. 21 is a schematic diagram showing a logic diagram for multiple circuits of a device having a plurality (N) of dual-sided sensors.
Figure 22:
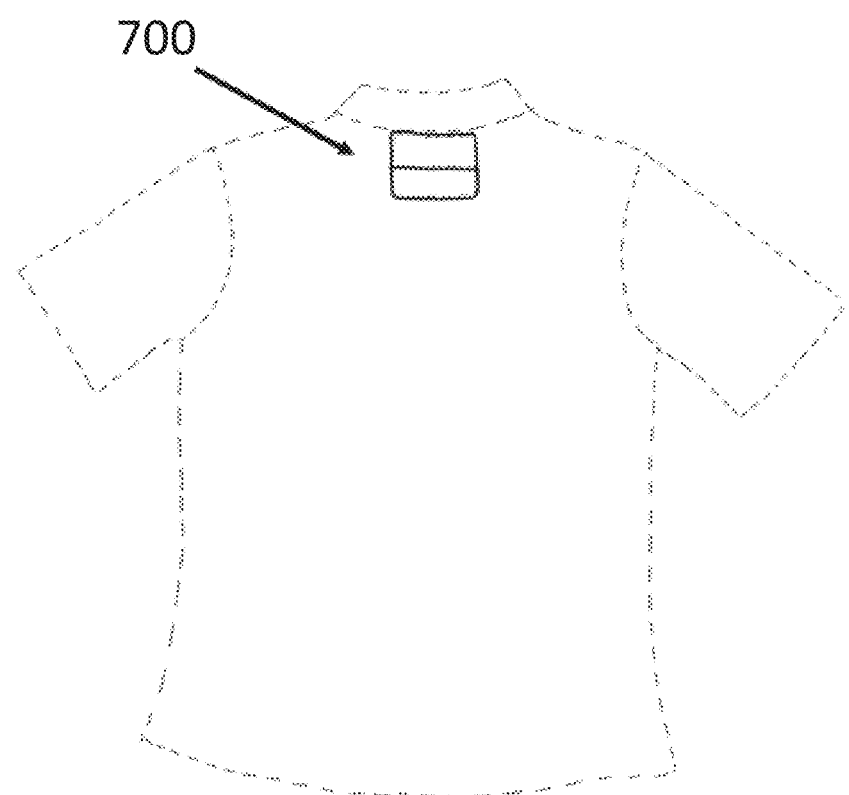
FIG. 22 is a schematic drawing of a shirt with pocket 700 located on the rear of the shirt that can house an electronics module (e.g., peripheral device or microcontroller) that connects to the sensors of the shirt.

A logic diagram for detecting an impact with a plurality (e.g., N) of dual-sided sensors is shown in FIG. 21. Each channel represents a dual-sided sensor. When any given dual-sided sensor pair detects an impact e.g., using a sensor finite state machine (FSM), the FIFO output is directed to an arbiter, which outputs all impact detection events to a universal asynchronous receiver-transmitter (UART), which can then be sent to an external processor (e.g., BLUETOOTH® low energy (BLE), multipoint control unit (MCU), and android), which can correlate each channel with a zone of the wearable device (FIGS. 1A-1B, 24, and 25).

Peripheral Device

A device (e.g., a wearable device or a device configured for use with a piece of equipment, such as a vehicle) can be configured as a system for use with a peripheral device running or accessing software (e.g., an application). The peripheral device may be any suitable medium for computing and/or displaying information. The peripheral device may include any suitable power source to run the device, such as a battery. The peripheral device may be a smartphone (e.g., ANDROID™, IPHONE®), tablet (IPAD®), computer, cloud-based device (e.g., server), a web-based device, smart glasses, or other information processing device. The peripheral device may be, e.g., a holographic or projected display device (e.g., smart glasses, such as GOOGLE® glass). The peripheral device may be programmed with a software application (e.g., that can be downloaded into the resident memory (e.g., non-transient memory) of the device and run locally on the peripheral device) to receive data that is detected by the sensors on the wearable device and then transmitted (e.g., with a transmitter) to the peripheral device. The peripheral device may include a display with a GUI, one or more processors coupled to the GUI, and a memory (e.g., non-transient memory) storing instructions that, when executed by the one or more processors, causes the one or more processors to perform a programmed operation. This operation may be used to direct an output action (e.g., bladder inflation and signaling for assistance). The operation may include rendering a GUI on a display, receiving an input of data (e.g., ballistic impact data, physiological data, or operational status data) to the GUI, and displaying the data on the GUI. The peripheral device may be configured to receive data from one or more sensors located within or on the device (e.g., the wearable device) via a wired or wireless connection. Alternatively, or in addition, the device and/or the peripheral device may include a transmitter and/or receiver to transmit the data generated by the sensors to the peripheral device. The transmitter may be, e.g., a smart chip, and can be configured for wired or wireless communication, e.g., through a BLUETOOTH® or Wi-Fi connection, to the peripheral device. The user of the device (e.g., the wearable device or the equipment) may use the peripheral device or a third party may use the peripheral device.

The peripheral device may access an application program that provides access to the sensor data via a remote server, e.g., with a cloud-based connection. The device (e.g., the wearable device) may include a peripheral device, e.g., attached thereto or separate from the device (e.g., as a handheld device). For example, a system may include a wearable device that includes impact detection sensors, integrated activity sensors, respiration sensors, and heart sensors. The wearable device may be connected to the peripheral device (e.g., smartphone) running or accessing a software program via a BLUETOOTH® connection. The peripheral device may include a mechanism to read an identification card (e.g., by scanning a barcode or QR code) so that important personal information about a user (e.g., medical history, allergies, handicap) is instantly uploaded to the peripheral device running or accessing the application, which can be used to customize the device to a particular user.

Additionally, the peripheral device running the application can be configured to communicate (e.g., through a wired or wireless connection, e.g., through a BLUETOOTH®, Wi-Fi, and/or internet connection) with a database that contains data collected by the device (e.g., the wearable device) or with another system that receives and processes the data and conveys the information to the peripheral device and/or displays the information on the GUI. Data collected by the device (e.g., the wearable device), such as data collected by the sensor(s), may be stored non-transiently in the database, the peripheral device, or other storage medium.

Application

The peripheral device may be configured to run or access software (e.g., an application). The application may include any suitable computing instructions (e.g., code) that causes the peripheral device to perform an operation. The user of the peripheral device, a third party responder, medical aide, or other relevant personnel may be running the application on his/her peripheral device (e.g., smartphone) to track information about the subject wearing or operating the device (e.g., a wearable device or equipment, such as a device configured for use with a vehicle). For example, the application may be programmed on and/or running locally on the peripheral device. Alternatively, or additionally, the application may not be programmed on and/or running locally on the peripheral device, but rather may be accessed on a remote device (e.g., cloud-based access). The application may include a security feature or login that requires the user to input log-in credentials, e.g., a username or password to access the peripheral device, the application, and/or the cloud-based connection. Exemplary peripheral devices and applications are described, e.g., in US Provisional Application 62/770,629, the disclosure of which is hereby incorporated by reference in its entirety.

Figure 17:
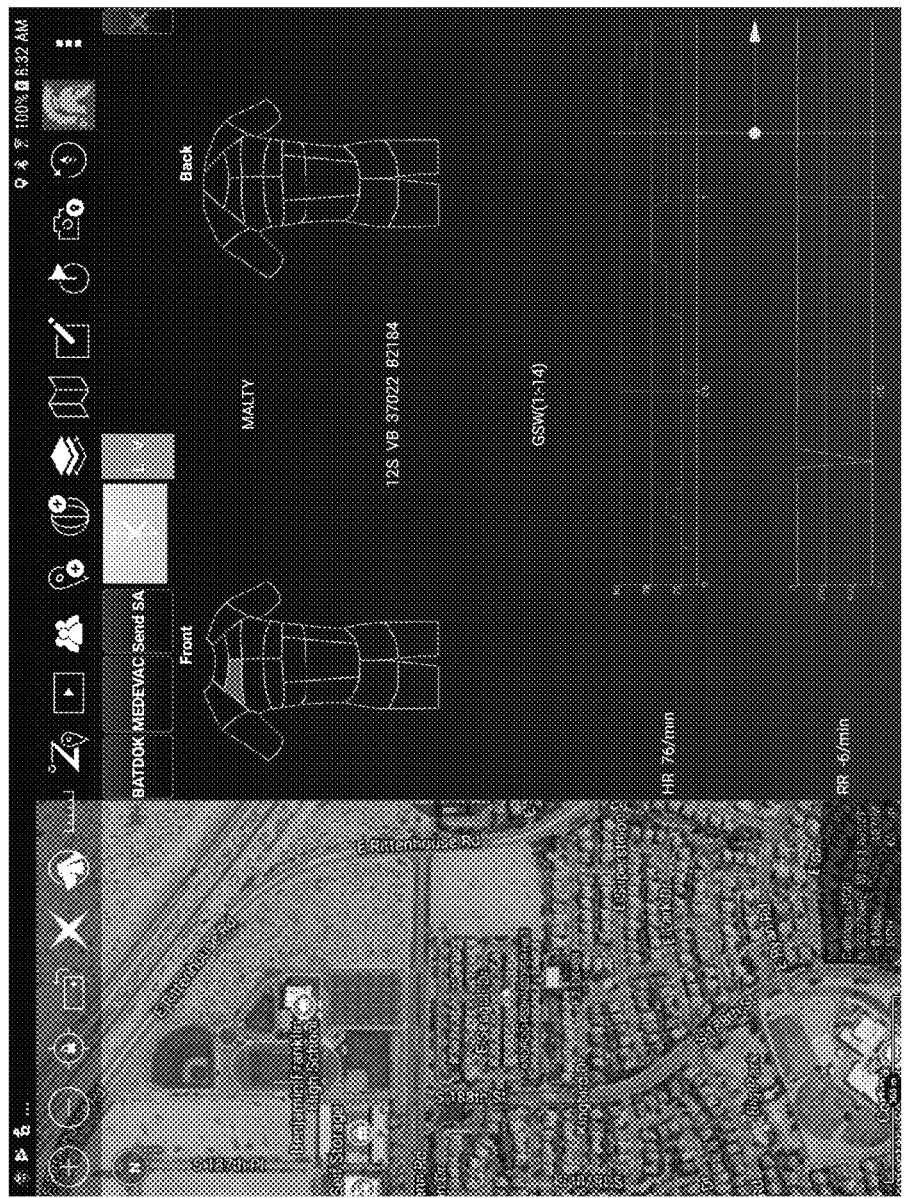
FIG. 17 is a screenshot of an application (e.g., mobile device application) configured to receive input from a device with a sensor.
Figure 18:
FIG. 18 is a screenshot of an application for a mobile device configured to receive input from a device with a sensor.

The wearable device or equipment device, such as a device configured for use with a vehicle, may be configured to communicate with a peripheral device, such as a smartphone (e.g., ANDROID™ or (PHONE®) running or accessing an application. The application may be running, e.g., on a holographic or projected display (e.g., smart glasses, such as GOOGLE® glass). The smartphone may be running an ANDROID™ tactical assault kit (ATAK) application or a similar application. ATAK is an ANDROID™ smartphone geo-spatial infrastructure application built using NASA World Wind. The application (e.g., ATAK application) provides situational awareness within both civilian and military arenas. The application may have a plugin architecture which allows developers to add or enhance functionality to the application. When used with the wearable devices described herein, the application (e.g., ATAK application) can display indicia related to the user or an episode (e.g., catastrophic episode, such as a ballistic impact) experienced by the user, such as projectile velocity, impact location, acceleration (e.g., moving or still) and orientation (e.g., prone or supine) information of the user, respiration rate, heart rate, user information, and geolocation (FIGS. 17 and 18). The device may transmit essential physiological indicia and sensor data to the user or to a third party responder using a smartphone running the application (e.g., ATAK application).

The application running on or accessible by the peripheral device may contain features used to control the functionality of the device (e.g., the wearable device or equipment, such as a device configured for use with a vehicle) or the sensors of the device (e.g., the wearable device or equipment, such as a device configured for use with a vehicle). Some features include a system on/off or reset switch, a power level indicator, the ability the turn certain sensors or regions of sensors or bladders on or off, or adjust the sensitivity of the sensors. The user of the application can track data from the sensors in real time or observe data over a long time period, and the information may be stored for later analysis. The application may be used to track the health status of an individual or the operational status of equipment, such as a vehicle, for example, by measuring various parameters, e.g., physiological parameters, such as heart rate or acceleration, or the condition of the individual, or operational parameters, such as the function or status of component parts of the equipment. The application can be made available for download (e.g., from the internet or the cloud, e.g., from a remote server) on a peripheral device.

The GUI may display front and rear views of the sensors, e.g., as placed on an avatar of the user (FIGS. 17 and 18) or on an avatar of the equipment, such as a vehicle. When the device senses an impact, the user, via the application on the peripheral device, can then observe when certain sensors are triggered, and an alert message can be transmitted.

The user of the application may adjust the threshold sensitivity of the sensors (e.g., impact detection sensors) or whether they trigger an alert upon activation. For example, a user or equipment (e.g., a vehicle) experiencing a small vibration would not want to trigger an alert message, but upon receipt of a high impact or powerful stimulus, the user would want the stimulus to trigger an alert message. In another example, a user or equipment (e.g., a vehicle) experiencing a single circuit breaking would not want to trigger an alert message, but upon both circuits of the sensor breaking, the user would want the stimulus to trigger an alert message. The user may also use differential zone pressure thresholds to vary the sensor threshold in different regions of the wearable device or device on a piece of equipment, e.g., a vehicle. For example, a user may wish to set a higher force threshold (e.g., 15-40 psi, such as 20 psi) for their torso, and a lower force threshold for the head (e.g., 0.5-15 psi, such as 10 psi), such that a lower impact force on the head (or, e.g., the engine, if configured for a vehicle) would trigger a distress signal, but the same impact force on the torso (or, e.g., the bumper, if configured for a vehicle) would not trigger a distress signal. Pressure thresholds may be achieved, e.g., by using separate pressure sensors or by adding resistors to the impact detection sensors. Pressure thresholds can also be configured based on the zones of sensors. The materials of the conductive layers can also be chosen, such that the circuit breaks at different pressure thresholds. For example, the circuit may break when experiencing a high velocity impact but would not break with incidental contact. Additionally, details about the nature and location of the stimulus that triggers activation of the device can be displayed on the GUI. For example, sensors located near a specific part or organ that detect a stimulus would alert the user or a third party responder that a specific organ or location on the body or equipment (e.g., a vehicle) is under duress. Therefore, a first responder would be better prepared upon arrival for treating the injured user or providing maintenance to the equipment (e.g., a vehicle). The user of the device can set certain emergency contacts and the emergency contacts can receive a text or SMS message, or a radio signal (e.g., TW-400) upon triggering of the device.

The application can include a geolocation feature that displays the global position (e.g., using GPS tracking) of the user on a map. The map may also show the position of other users (e.g., team members) using a peripheral device, application, and/or wearable device (e.g., wearable device with one or more, e.g., 2, 3, 4, 5, 6, 7, 8, 9, 10, or more bladders). The application may have a screen that displays user information, such as name, roster, unit, allergies, an identification number (e.g., a social security number), and blood type. When an ID card is scanned at the beginning of a mission, the application can automatically load the various user information in order to personalize the wearable device and system for a specific user. The application may have a screen that displays system status, such as power, connectivity signal, and status of the impact and vital signs monitoring (VSM) sensors.

The application may have a screen that displays the system settings, which can be adjusted by the user. The impact detection sensors, VSM sensors, and alerts can be turned on or off and the level of sensitivity can be adjusted on a discrete or sliding scale (e.g., from 1 to 10, or from sensitive to robust). The application may include a screen that includes a map that displays the position of each member of a team, e.g., as an encircled dot. In the event that a high velocity impact is detected on a user, the dot may change to a different indicator, e.g., a color change, such as red, to alert the other team members. The components of the system interact with the peripheral device to signal (e.g., via the application or radio) to alert the other team members.

One of the other team members may then request a third party responder (e.g., medical evacuation team) if the injury is serious. Exemplary applications are described, e.g., in US Provisional Application 62/770,629, the disclosure of which is hereby incorporated by reference in its entirety.

Once the application running on or accessible from the peripheral device identifies or senses that the user wearing the wearable device has been injured, the application can activate multiple features to transmit information specific to the injured user to appropriate personnel. For example, the application may include a screen that shows a map displaying the position of an injured user. Each team member can click an icon on the map to open a user information card (e.g., technical combat casualty care (TCCC) card) corresponding to the injured team member. Information, such as the location (e.g., arm, torso, and chest) and force (e.g., 10 pN-1000 pN) of the impact, VSM information (e.g., heart rate (beat/min), respiration rate (respirations/min)), and the time or point of impact (TOI/POI) time stamp may be displayed. The application may also include a medical evacuation request icon to initiate a medical evacuation request, e.g., using medical evacuation request form. The application may have a screen to input information. This information may be tabulated in an electronic user information card (e.g., electronic TCCC card) for easy visual consumption by a third party responder. For example, the application may include a screen with various information boxes that are pre-populated (e.g., evacuation category, name, date, unit, battle roster, identification number (e.g., social security number), time, and allergies), but can be overwritten (e.g., by the injured person or a third party responder), if necessary or desired. Additionally, the screen may display a continuous live transmission view of the injured team member's vital signs, such as heart rate and respiration rate.

The application may include a mode to display and/or allow input of a cause of the injury (e.g., artillery, burn, fall, grenade, gunshot wound (GSW), improvised explosive device (IED), landmine, motor vehicle collision (MVC), rocket propelled grenade (RPG), and other). The application may include a mode to display and/or allow input of the location and type of injury on the user. The application may include a mode to display and/or allow input by a user (either the injured user, a team member, or a third party) where on the body (e.g., right, left, arm, or leg) the injury occurred. The application may include a mode to display and/or allow input of signs and symptoms of the user, including time, blood pressure, pulse and oxygen saturation, alert, voice, pain, unresponsive (AVPU), and pain scale (e.g., 1-10) following an injury. The application may include a mode to display and/or allow input of a treatment performed (e.g., by a third party responder) on the injured user, such as the use of an extremity tourniquet, junctional tourniquet, pressure dressing, hemostatic dressing, intact device, cricothyrotomy (CRIC), supraglottic airway (SGA) device, nasopharyngeal airway (NPA) device, endotracheal tube, oxygen, chest tube, chest seal, or needle. The application may include a mode to display and/or allow input of a blood treatment performed on the injured user, such as fluid and blood product, and name, volume, route, and time. The application may also include a mode to display and/or allow input of medicines administered to the injured user, such as analgesics, antibiotics, or other therapeutics, and name, dose, route, and time, and/or treatments administered, such as combat pill pack, eye shield (e.g., right or left), splint, or hypothermia prevention. The application may further include a mode to display and/or allow input of additional notes.

Once the information is filled out using the application, the application provides further functionality allowing the injured user or a third party responder to request medical evacuation and/or to send the user information card (e.g., an electronic TCCC card) to another responder or medical evacuation team. If the user or a responder determines that a medical evacuation is required, the user can input location (e.g., GPS location) by selecting, e.g., XYZ grid coordinates on a map. The user requesting medical evacuation can also input a specific radio frequency and call sign and suffix that he is using and indicate number of injured users or others, e.g., patients (PXT) by precedence, (e.g., urgent, urgent-surgery required, priority, routine, and convenience). Furthermore, the application includes programming to allow the user to request special equipment, such as a hoist, extraction equipment, or a ventilator. The application may include an entry to indicate the number of inured users or others, e.g., patients (PXT) by type (e.g., litter and ambulatory). The application may also include a feature to indicate the wartime security of the user zone (e.g., no enemy troops, possible enemy, enemy in area/proceed with caution, and enemy in area/armed escort required). The application may also include a feature to indicate method of marking (e.g., panels, pyrotechnic signal, smoke signal, or no signal). The user requesting medical evacuation can indicate nationality and status (e.g., US military, US civilian, non-US military, non-US civilian, and enemy prisoner of war (EPW)) of an injured user or other personnel. Additionally, the user requesting medical evacuation may indicate the wartime nuclear, biological, or chemical (NBC) contamination status (e.g., chemical, biological, radiological, and nuclear). If using, e.g., an ATAK platform and a TCCC card, the application can process all of the sensor data and the information inputted and/or gathered via the GUI onto an electronic TCCC card to summarize all of the information for a third party responder. If not using an ATAK platform, the application can process all of the sensor data and the information inputted and/or gathered via the GUI onto a user information card (e.g., electronic user information card). The application may also output the data onto a medical evacuation request form to summarize all of the information for a third party responder. An exemplary medical evacuation request form is shown in Table 1 below.

TABLE 1

Medical Evacuation Request Form

| LINE ITEM | | EXPLANATION | WHERE/HOW OBTAINED | WHO NORMALLY PROVIDES | REASON |
|---|---|---|---|---|---|
| 1 | Location of pickup site | Encrypt the grid coordinates of the pickup site. When using the DRYAD Numerical Cipher, the same "SET" line will be used to | From map | Unit leader(s) | Required so evacuation vehicle knows where to pick up patient. Also, so that the unit coordinating |

TABLE 1-continued

Medical Evacuation Request Form

| LINE ITEM | EXPLANATION | WHERE/HOW OBTAINED | WHO NORMALLY PROVIDES | REASON |
|---|---|---|---|---|
| | encrypt the grid zone letters and the coordinates. To preclude misunderstanding, a statement is made that grid zone letters are included in the message (unless unit SOP specifies its use at all times). | | | the evacuation mission can plan the route for the evacuation vehicle (if the evacuation vehicle must pick up from more than one location). |
| 2 Radio frequency, call sign, and suffix | Encrypt the frequency of the radio at the pickup site, not a relay frequency. The call sign (and suffix if used) of person to be contacted at the pickup site may be transmitted in the clear. | From SOI | RTO | Required so that evacuation vehicle can contact requesting unit while en route (obtain additional information or change in situation or directions). |
| 3 Number of patients by precedence | Report only applicable information and encrypt the brevity codes.<br>A - URGENT<br>B - URGENT-SURG<br>C - PRIORITY<br>D - ROUTINE<br>E - CONVENIENCE<br>If two or more categories must be reported in the same request, insert the word "BREAK" between each category. | From evaluation of patient(s) | Medic or senior person present | Required by unit controlling vehicles to assist in prioritizing missions. |
| 4 Special equipment required | Encrypt the applicable brevity codes.<br>A - None<br>B - Hoist<br>C - Extraction equipment<br>D - Ventilator | From evaluation of patient/situation | Medic or senior person present | Required so that the equipment can be place on board the evacuation vehicle prior to the start of the mission. |
| 5 Number of patients by type | Report only applicable information and encrypt the brevity code. If requesting medical evacuation for both types, insert the word "BREAK" between the letter entry and ambulatory entry.<br>L + # of patients - Litter<br>A + # of patients - Ambulatory (sitting) | From evaluation of patient(s) | Medic of senior person present | Required so that the appropriate number of evacuation vehicles may be dispatched to the pickup site. They should be configured to carry the patients requiring evacuation. |
| 6 Security of pickup site (wartime) | N - No enemy troops in area<br>P - Possibly enemy troops in area (approach with caution)<br>E - Enemy troops in area (approach with caution)<br>X - Enemy troops in area (armed escort required) | From evaluation of situation | Unit leader | Required to asssist the evacuation crew in assessing the situaion and determining if assistance required. More definitive guidance can be furnished the evacuation vehicle while it is en route (specific location of enemy to assist an aircraft in planning its approach). |

Graphical User Interface (GUI)

The peripheral devices described herein may include a GUI that displays, e.g., various sensor information and/or health indicia associated with a user wearing the wearable device or operational status of a device configured for use with a piece of equipment, such as a vehicle. The sensor information and/or health indicia may be collected by the sensors (e.g., impact detection sensors and/or biometric sensors), e.g., on the wearable device or equipment device (e.g., vehicle), and processed by the application. The application outputs the information to the GUI. The application can be configured to output information regarding the status of the device (e.g., the wearable device or the equipment/device), such as stored energy level or remaining battery power or on/off status. The application can also output data to the GUI regarding information about the features or stimuli detected by the sensors of the wearable device. The GUI may be an LED device or other monitor, tablet, or smartphone, or the like, as long as it is capable of displaying or depicting information to a user. The GUI may include holographic or projected display (e.g., smart glasses, such as GOGGLE® glass). The GUI may be connected (e.g., wired, or wirelessly) to or integrated with the wearable device, equipment (e.g., a vehicle), or to the peripheral device. The GUI may be connected to a central information processing unit of the wearable device or equipment. The GUI may be affixed on the wearable device or equipment, for example, on the arm, torso, or belt region of the wearable device, or on the equipment (e.g., a vehicle). Alternatively, the GUI may be integrated into the materials of the device or affixed on top of the outer layer of the device. The GUI may be the peripheral device or part of the peripheral device.

Information Processing Unit

The peripheral device and/or the wearable device may include an information processing unit. The information processing unit may include one or more of a processor, controller, a programmable memory, and/or a data storage system (e.g., a flash memory system) which can be used to record data from sensor inputs. The unit processes the signals received from the impact detection and/or other sensors (if incorporated), such as vital signs monitoring (VSM) sensors, temperature sensors, moisture sensors, and pressure sensors. Depending on the outcome of the computation in interaction with the program stored on the memory, the unit may then alert a third party responder (e.g., medical responder or team member, or a mechanic). Furthermore, the unit may transmit a signal to activate the wearable device to treat the injured subject, e.g., by inflating bladders in the region where the injury was detected. This process is described, e.g., in PCT Publication No. WO2015183470 and PCT Application No. PCT/US2018/033241, the disclosures of which are hereby incorporated by reference in their entirety. The unit may also determine the need to inflate certain other areas (e.g., in order to provide for an increase of buoyancy forces to keep a user afloat that was injured while in or by the water). The information processing unit may also trigger the transmission of data (such as a distress signal) via a data transmission unit. The information processing unit may be incorporated into the peripheral device and programmed to interact with the application or vice versa. The information processing unit may be a smartphone (e.g., ANDROID™). Alternatively, the information processing unit may be part of a cloud-based or internet-based system (e.g., a remote server).

The information processing unit may be configured to identify the nature (e.g., directionality or force) of the impact or wound by analyzing sensor data. For example, by sensing the pressure at an impact area, the information processing unit can quantify the mass, velocity, and size of a projectile hitting the wearable device. Furthermore, the information processing unit can be configured to identify where the projectile enters and/or exits the wearable device or equipment (e.g., a vehicle), and, thus, the relative entry and/or exit wounds on the body of the user or equipment (e.g., a vehicle). By coupling this data with the specific location on the device where the impact occurs, indicia is provided that can alert the user and/or a third party responder as to the identity, nature, and severity of the wound to the user or the damage to or destruction of the equipment.

The information processing unit may be configured to integrate data obtained from multiple different types of sensors to provide essential physiological information about the health status of a user or the operational status of equipment. By integrating various sensor data, the information processing unit provides increased situational awareness for the user and/or a third party responder. For example, if the impact detection sensors detect a projectile contact at a zone near to or located at the arm, and the GPS sensors (e.g., geolocation sensors) determine that the user is still moving, the third party responder receiving this sensor data information may determine that the person is not in need of immediate attention. However, if the impact detection sensors detect a projectile contact at a zone near to or located at the heart, and the orientation and acceleration sensors determine that the user is not moving and/or is in a prone position, a third party responder receiving this sensor data information may determine that the user may be in need of immediate attention. The sensors can use information such as impact location, time passed since impact, and biometric data (e.g., breathing rate) to signal for remote triage, e.g., to categorize response in order of importance. In some instances, by combining the sensor data, the information processing unit can determine false positives and false negatives by corroborating the severity of the injury between multiple types of sensors. For example, if a heart rate sensor does not detect a heart rate of the user, but the geolocation or GPS sensor detects movement of the user and/or an upright, standing position of the user, the device can notify the user and/or a third party responder that the absence of a heart rate signal may be false or in error.

Wearable Device

Featured are wearable devices that may include one or more multi-layered sensors. Also featured are peripheral devices programmed with software (e.g., an application) or capable of accessing software remotely (e.g., via a cloud-accessible or internet-accessible server) and configured to interact with a wearable device including one or more sensors as described herein. The wearable device can be worn by any subject, such as a human or another mammal (e.g., a dog). Exemplary wearable devices that may be used with the devices, systems, and methods described herein are described, e.g., in PCT Publication No. WO2015183470 and PCT Application No. PCT/US2018/033241, the disclosures of which are hereby incorporated by reference in their entirety.

The wearable device may include a networked layer of one or more (e.g., 2, 3, 4, 5, 6, 7, 8, 9, 10, or more) bladders that can be individually (or in groups, such as one or more regions of a garment) inflated and deflated. There may be sets of one or more (e.g., 1-20, 2, 3, 4, 5, 6, 7, 8, 9, 10, 11, 12, 13, 14, 15, 16, 17, 18, 19, and 20) bladders in a wearable device that are interconnected. The wearable device may also have 2-20 groups of such sets of 1-20 interconnected bladders. The bladders of the different groups may or may not be connected.

A set of one or more (e.g., 2, 3, 4 5, 6, 7, 8, 9, 10, or more) sensors or a pressure sensitive layer senses impacts to the device or penetration of objects through the device, which may pass into the body of the wearer. The impact triggers (e.g., automatically) the inflation of one or more of the bladders (or one or more groups of bladders) to seal off the site of penetration, and maintains pressure on the site, e.g., until attention can be given to the wearer (e.g., emergency care). The inflation of the bladders may be triggered by the impact detection sensors. When the sensors detect an impact above a predetermined threshold, the sensors relay this information to the peripheral device. The processors in the peripheral device (or at the remote location) can be configured to perform a computer implemented method that can be used to identify the impact detection stimulus and to output an instruction to trigger inflation of the bladders (e.g., one or more bladders at the site of impact or within a zone of sensors at or near the site of impact).

The inflation of bladders of the wearable device may also be triggered manually. The device may feature elastic materials that maintain the structural integrity of the device, while achieving a balance between rigidity required for wound pressure and immobilization and flexibility required to accommodate rapidly filling inflatable bladders and user comfort. Furthermore, the wearable device may be designed with modular components such that all components are easily removable for replacement and/or washing of the wearable device.

The wearable device may be used to control bleeding from severed or damaged peripheral blood vessels. The wearable device may be used to stabilize a subject (e.g., for transport or in cases where medical attention cannot be provided immediately). The wearable devices described herein can be used to stabilize the patient by, e.g., controlling bleeding from a damaged vessel and/or by providing stabilization of a broken or fractured bone. Also, the devices may be used to assist in increasing perfusion pressure to the heart and brain in a number of disease states, such as hemorrhagic shock, cardiogenic shock, and cardiac arrest.

The wearable device may also be configured as a wearable garment (e.g., a shirt, vest, jacket, pants, shorts, sleeve, wrap, bodysuit, sock, hat, helmet, glove, shoes, and brace). The wearable device may also be used to provide an automated emergency treatment for controlling or reducing fluid loss (e.g., loss of blood by hemorrhage) in places where compression is needed but where a tourniquet is not desired or cannot be used or where control by manual compression may be difficult.

The wearable device may minimize (e.g., reduce or eliminate) fluid loss from an object or individual (e.g., loss of blood by hemorrhage) caused by an impact. This includes inflating one or more (e.g., two or more, three or more, four or more, five or more, ten or more, twenty or more, fifty or more) of the bladders in the device in response to the impact, whereby inflation of the bladders at the site of the impact minimizes the fluid loss by applying pressure at the impact site. For example, the bladders can be designed to fill with a gas (e.g., from a gas (e.g., $CO_2$) cartridge that causes the bladders to expand in size, e.g., by 10%, 20%, 30%, 40%, 50%, 60%, 70%, 80%, 90%, 100%, 200%, 300%, 400%, 500%, 600%, 700%, 800%, 900%, 1000%, or more. The device may reduce fluid loss by 50% or more (e.g., 60%, 70%, 80%, 90%, or 100%) at the site of impact from the time of impact, after activation and inflation of the bladders. The fluid loss may decrease by 50% or more (e.g., 60%, 70%, 80%, 90%, or 100%) after 2 seconds or more (e.g., 5 seconds, 10 seconds, 30 seconds, 60 seconds) from the time of impact, after activation and inflation of the bladders.

The wearable device can be configured to act as a tourniquet, e.g., if a limb is severely wounded or lost (e.g., due to a bomb or other blast). Alternatively, or in addition, the devices of the invention may provide an automated stabilization system that can be used to stabilize all or a portion of the body (e.g., by restricting movement (e.g., for transportation purposes or when medical attention may be delayed), such as in the case of a broken or fractured bone). Alternatively, or in addition, the devices of the invention may provide buoyancy, for example, if used in a diving suit to keep an unconscious user afloat. The invention may also be used to immobilize a head, neck, or torso of a user, following a traumatic brain injury or spinal cord injury.

The wearable device can promote survival during the "golden hour." After an object penetrates and damages the user's tissue and blood vessels the device can apply pressure to the site of the wound in order to reduce or stop the loss of blood. Preferably the user is wearing the device prior to receiving the wound. When damage to the user occurs, the system can automatically provide on-site treatment. The device may also be triggered manually (e.g., by the user or another person) to assist with stabilization of, e.g., the entire body of the wounded person, e.g., for transportation purposes. The device may be a full body suit or it may be configured as a wearable garment, such as a shirt, vest, jacket, pants, shorts, sleeve, wrap, bodysuit, sock, hat, helmet, glove, shoes, and brace.

The wearable device may include one or more functional layers, including, for example, the following: an inner layer, an outer layer, an impact detection layer, an optional layer that contains a wound sealant, and a pressure (on the body of the user) generating layer that includes the bladders (see, e.g., PCT Publication No. WO2015183470 and PCT Application No. PCT/US2018/033241, the disclosures of which are hereby incorporated by reference in their entirety). The layers do not need to be separate units, but rather can be combined within one layer or system (e.g., combining the detection capabilities with the wound sealant delivery system). Also, if chosen, one can incorporate only one or multiple layers (e.g., one could only have the detection layer, or the detection and the bladder layer, or only the wound sealant layer). The wearable device may include any suitable power source, such as a battery.

The impact detection system identifies the location on the body where the impact of an object occurred and may also determine the degree and severity of the impact. This data is sent to the information processing unit (e.g., in the device or in a peripheral device), which can trigger the release of a pressurized medium (e.g., a gas, such as a non-flammable or an inert gas, in particular air, carbon dioxide, or argon), into the bladder system. The device may trigger pressurization only in the region where the impact has occurred in order to direct the flow of wound sealant to this site and/or to inflate only bladders in this region. The object that penetrated the layer(s) of the device may have also destroyed part of the system.

Substantially simultaneously with, or after, the impact, the bladders are pressurized in the area of the impact. The pressurized medium will inflate one or more bladders that were not destroyed by the impact and are activated by the device. The bladders are very small when deflated (e.g., an area of about 10 mm×10 mm to 50 mm×50 mm, and 1 mm to 10 mm in depth), but will expand significantly upon inflation (e.g., up to 10 cm×10 cm to 20 cm×20 cm and 1 cm to 10 cm in depth). The bladders are connected within a network, e.g., a network of tubing (or a series of separate tubes, e.g., for each group of bladders) or similar structure. Any airtight or semi-airtight network of channels will function as a type of tubing, such as laminating or tightly weaving together two fabrics. The flow resistance in the network is equal to or higher than the forces required to inflate the bladders.

The wearable device may include a plurality of tube networks (e.g., 2, 3, 4, 5, 6, 7, 8, 9, 10, 20, 30, 40, 50, 60, 70, 80, 90, 100 or more) such that each bladder or zones of bladders (e.g., corresponding to the zones of FIGS. 1A-1B) can be independently inflated separately from the other bladders of the wearable device. The tube network may optionally include one or more valves to independently control inflation and direct airflow to a particular bladder or subset of bladders.

The pressure inside the bladder will depend on the type of material, and the thickness and geometry used in order to allow for such an increase in size, but will typically be from about 5 psi to about 50 psi (e.g., 10 psi, 15 psi, 20 psi, 25 psi, 30 psi, 35 psi, 40 psi, 45 psi, and 50 psi, e.g., 20 psi). Depending on the design choice however, balloons similar to the ones used in angioplasty may be used as well, with nominal pressures typically ranging from 90-120 psi.

The pressure produced by the bladders against the body may be sufficient to produce a pressure sufficient to reduce fluid (e.g., blood) loss and/or hemorrhage. For example, the pressure produced against the body may be at least 2 psi (e.g., from about 2 psi to about 50 psi, e.g., from about 5.8 to about 19.3 psi, e.g., 6 psi, 7 psi, 8 psi, 9 psi, 10 psi, 11 psi, 12 psi, 13 psi, 14 psi, 15 psi, 16 psi, 17 psi, 18 psi, and 19 psi). In areas on the body where compression of muscles and/or other organs is required, e.g., because the blood vessels are beneath muscle and/or organ, a higher pressure may be required to blood loss. However, if an artery is at the surface (e.g., close to the skin) and a bone is on the other side of the artery, a lower pressure will be sufficient to reduce blood loss.

The information processing unit (e.g., in the peripheral device) may also trigger the transmission of data, such as an emergency beacon signal, that may be used to indicate the location of the user, e.g., using a global positioning module incorporated into the device, in particular, after activation of one or more sensors. It may also process data from body sensors (e.g., to measure heart rate, etc.), if integrated.

In case of an electrical system malfunction, or if desired by the user or another person, the device can also be activated using a manual override. The manual override can be used to trigger all or a part of the bladders of the wearable device. For example, a rip cord having a handle attached thereto may be positioned on a front portion of the wearable device and connected with the valve system of the pressurized medium, such that the person wearing the device can manually open the valve to release the pressurized medium therefrom.

The device can be fabricated with modular components. All components (e.g., layers, sensors, bladders, processing units, gas cartridges, and other accessories or additional components) can be easily removed in modular fashion. For example, the information processing unit (e.g., peripheral device) may be removed such as in. If a component breaks or is damaged through use or through normal wear and tear, it can be removed or replaced. Furthermore, components can be separated from the device so the fabric of the device (e.g., the wearable garment) can be washed.

The wearable device may be configured for use with an animal, such as a dog, pig, horse, or cow (FIGS. 34A-34C and 35).

The wearable device may be configured with video and/or audio feed input and/or output.

The wearable device (e.g., garment) may be configured with a pocket. The pocket may be used to connect the leads of the conductive threads of each sensor to an electronics module (e.g., peripheral device or microcontroller). The pocket may be positioned in any location on the wearable device that is convenient and does not interfere with the function and/or comfort of the device. For example, the pocket may be positioned on the back of the wearable device, e.g., below or near the neck (e.g., back of the neck) of the wearer (FIGS. 23B, 27A-27B, 28-30, and 31A-31B). The pocket may also include an opening to access the pocket from the inside of the wearable device. The pocket may be positioned so as not to interfere with ballistic armor (e.g., bulletproof vest) if the user is wearing an extra layer of protection over the wearable device (FIGS. 32 and 33). The wearable device may be structured such that the leads of all of the conductive threads of each sensor or zones of sensors flows to a single location. This affords ease of connection for all of the sensors to an electronics module. As shown in FIGS. 30 and 31A-31B, the leads can be connected to an electronics module in the pocket, and the module can be connected to a peripheral device (e.g., smartphone or tablet) via a wired connection. As is shown in FIGS. 37A-37B, 38A-38B, and 39A-39C, the exposed conductive threads can be connected to a multi-pin, multi-row connector. The pins on connector may be sharp to punch through the fabric and crimp to the exposed threads.

Additional Sensors

The devices described herein (e.g., wearable devices or devices configured for use with a piece of equipment, such as a vehicle) may further include one or more additional sensors (e.g., biometric or physiological sensors), such as sensors for measuring impact, temperature, moisture level, pressure, acceleration, and vital sign information, such as heart rate, blood pressure, or similar indicia. The device may further include chemical, biological, radiological, and nuclear (CBRNE) sensors. These sensors may transmit information to the peripheral device that is displayed on a GUI thereof. The sensor data can be processed by the information processing unit and the data can be stored non-transiently and/or transformed into a useful output indicative of the health state of a subject. The sensors may be powered by a power source or energy unit, and they may send their data to the information processing unit (e.g., in the peripheral device or at a remote location). Physiological sensors may be attached to or located on or within the wearable device, and may be operably engaged to the wearer for generating physiological signals corresponding to selected physical conditions of the user. The data from sensors may be processed by the application to trigger a distress signal. The distress signal may include information corresponding to the physiological signals. For example, the physiological sensor may be a thermometer for measuring the body temperature of the user and the distress signal may include information about the body temperature of the user. The physiological sensor may be a blood pressure meter for measuring the blood pressure of the user and the distress signal may include information about the blood pressure of the user.

The sensors may use electrocardiography to measure heart rate, a pulse oximeter to measure oxygen saturation levels, or a temperature sensor to measure body temperature. The sensors may be strategically placed near a certain organ or organ group (e.g., kidneys, heart, and brain) to track certain physiological parameters associated with a specific organ. For example, a sensor or set of sensors can be placed near the heart to track heartbeat. The location of these sensors can also be used to transmit information to the user of the device or to a third party upon activation of these sensors (e.g., when a value of the sensor output passes above or below a predetermined threshold). For example, if a set of sensors placed near the heart detects a drop in heartrate (e.g., with electrocardiography), the device would activate to send a distress signal to a third party responder. The software of the peripheral device or the information processing unit can link the sensors to their respective organs. The sensors may also detect a rupture of the wearable garment and generate a signal on the GUI via the software application (e.g., as part of the programming of the application).

The device may be configured with one or more accelerometers, gyroscopes, magnetometers, barometers, relative humidity sensors, bioimpedance sensors, thermometers, biopotential sensors, or optical sensors. Accelerometers (e.g., ADLX345 chip) may be used to track steps, gait, activity, ballistocardiography, heart rate, heart rate volume, relative stroke volume, and respiration rate. A gyroscope (e.g., L3G4200D chip) may be used to track rotation and balance. A magnetometer (e.g., MC5883L chip) may be used to perform magnetoencephalography by recording magnetic currents and electrical circuits. A barometer (e.g., BMP085 chip) may be used to measure pressure. A relative humidity sensor (e.g., Si7023 chip) may be used to measure relative humidity. A bioimpedance sensor (e.g., AFE4300 chip) may be used to measure body composition and EIM. A thermometer (e.g., BMP085 chip) may be used to measure temperature. A biopotential sensor (e.g., HM301D chip) may be used to measure electroencephalography (EEG), electromyography (EMG), echocardiography (EKG), heart rate, heart rate volume, and pulse transit time (blood pressure). An optical sensor (e.g., MAX30100 chip) may be used to measure pulse oxygenation and blood pressure. A photoplethysmography sensor or electrocardiogram (ECG) sensor may be used to track heart rate. A light sensor may be used to measure pulse oximetry (e.g., blood oxygen saturation).

If the device is configured for use with equipment, such as a machine or vehicle, sensors may also include sensors for speed, oil pressure, and altitude, among others.

Any of the sensors described above may be configured to transmit various data, e.g., to an information processing unit or a peripheral device. The peripheral device running an application can then use an algorithm to convert the physiological data into biofeedback indicia on a user or the operational data into status indicia for equipment. The biofeedback indicia may then be rendered on a GUI (e.g., of the peripheral device) for visualization by the user, another user, a central command unit, a team member, or a third party responder. The sensors may track essential vital signs, such as heart rate, blood pressure, orientation, and temperature, to provide critical information for assessing the health state of a user wearing a device containing the sensors. These sensors may be integrated into the device and configured to interact with the peripheral device and/or information processing unit, e.g., by transmitting the biofeedback data (e.g., via BLUETOOTH®) to the peripheral device, a GUI, or a third party. By communicating these vital biofeedback indicia, the wearable device and/or the peripheral device can provide information, e.g., to a user or a third party responder, about the nature and severity of an impact or injury to a wearer of the device.

Structure

Referring to FIG. 2, the sensor contains at least three layers, conductive layers 20 and 30, and nonconductive layer 10. The sensor may be integrated into a wearable device (FIGS. 1A-1B), which can be worn by a subject (e.g., human subject). The wearable device may be configured as a shirt with a plurality of sensors, and each sensor corresponds to a zone or region on the wearable device. Nonconductive layer 10 may be the fabric of the wearable device (FIGS. 3A-3B), such that each sensor 50 is integrated within the shirt. Alternatively, nonconductive layer 10 is separate from the wearable device (FIGS. 4A-4B), such that each sensor 50 is placed upon fabric 40 of the wearable device. In an alternative embodiment, the shirt contains a single layer with a non-conductive fabric on the outside of the shirt with embroidered conductive thread on the inside of the shirt. In this embodiment, the torso may be characterized as a non-conductive layer. In yet another embodiment, the shirt may contain a single layer with a conductive thread sewn on the outside of the non-conductive fabric. Referring to FIG. 6, each sensor may include, e.g., an interdigitated pattern for maximum coverage, and interconnected sensors 200, 300, 400, 500, etc., may be arranged throughout the shirt (FIG. 13) with boundaries between sensors delineated by lines 600. As shown in FIG. 9, the leads of sensors 200, 300, 400, and 500 are connected to wires 80, which are in turn connected to a microcontroller, such as the PCB board shown in FIG. 16. As shown in FIGS. 23A-23B, and 24, the leads of the sensors may all be connected at a single locus, such as on the back of the neck. The leads may be connected to an electronics module 900 (e.g., peripheral device or microcontroller) via connector 800 in pocket 700 (FIGS. 27A-27B, 29, and 30). The electronics module may be connected to a peripheral device (e.g., smartphone or tablet) via peripheral device connector 810 (FIG. 30).

The wearable device may optimally include or be connected (e.g., wirelessly) to a peripheral device (FIG. 18), such as a smartphone, which may be programmed to run an application. The wearable device and/or the peripheral device may include any suitable power source, such as a battery, connected to the wearable device and/or the peripheral device. The peripheral device may communicate wirelessly with the wearable device. The peripheral device may be physically connected to the wearable device, such as on the sleeve of the wearable device.

The wearable device may contain a layer of one or more inflatable bladders above or below the sensor layer. The bladders are very small when deflated (e.g., an area of about 10 mm×10 mm to 50 mm×50 mm, and 1 mm to 10 mm in depth), but can expand, e.g., with stretching, significantly upon inflation (e.g., up to 10 cm×10 cm to 20 cm×20 cm and 1 cm to 10 cm in depth). The bladders are connected within a network, e.g., a network of tubing or similar structure. The wearable device may include a plurality of tube networks (e.g., 2, 3, 4, 5, 6, 7, 8, 9, 10, 20, 30, 40, 50, 60, 70, 80, 90, 100 or more) such that each bladder or zones of bladders (e.g., corresponding to the zones of FIGS. 1A-1B) can be independently inflated separately from the other bladders of the wearable device. The tube network may optionally include one or more valves (e.g., 2, 3, 4, 5, 6, 7, 8, 9, 10, 20, 30, 40, 50, 60, 70, 80, 90, 100 or more) to independently control inflation and direct airflow to a particular bladder or subset of bladders. The bladders are connected, e.g., through the one or more tube networks, to a pressurized medium for filling the bladders, such as a gas canister or cartridge. The gas canister or cartridge may be present on or within the wearable device, such as on the sleeve or back of the wearable device, if provided as a shirt, on the hip or thigh, if provided as pants or shorts, or in a separate pack or pouch connected to the wearable device.

Operation

The following section describes the function of a wearable device for use with a human subject (see, e.g., FIGS. 1A-1B). Penetration of the outer layer of a wearable device by an object activates one or more sensors of the device, which includes a plurality of multilayered sensors integrated into the outer layer. Each sensor corresponds to a zone of the wearable device and includes a digital circuit. When the circuit is broken by the impact, the signal corresponding to the broken circuit is transmitted to a microcontroller. The microcontroller may be connected to a clock and a counter (FIG. 14), which, in concert with the microcontroller, is able to determine a timestamp of each sensor layer circuit breaking.

A logic diagram for detecting an impact by a dual-sided sensor is shown in FIG. 20, and shows how the sensor can detect a normal impact (e.g., both circuit layers breaking), a timeout (outer layer only breaks) or an error state (inner layer only breaks). The time at which each circuit breaks is logged (e.g., T1 and T2) and can be written to an output, e.g., first in first out (FIFO). A logic diagram for detecting an impact with a plurality (e.g., N) of dual-sided sensors is shown in FIG. 21. When any given dual-sided sensor pair detects an impact e.g., using a sensor finite state machine (FSM), the FIFO output is directed to an arbiter, which outputs all impact detection events to a universal asynchronous receiver-transmitter (UART), which can then be sent to an external processor (e.g., hardwired, BLUETOOTH® low energy (BLE), multipoint control unit (MCU), and android), which can correlate each channel with a zone of the wearable device (FIGS. 1A-1B, 24, and 25).

The velocity of the impact may be determined from calculating the time delta between each conductive layer. The individual sensors that detect impact are in known positions in the wearable device. This can be used to determine the relative position of the impact. The relative timing of sequential detected impacts in conjunction with estimated position may be used together to determine whether a detected impact is an entry or exit wound.

The data from the sensors is sent to an information processing unit (e.g., a peripheral device) that is able to use the sensor data to determine location on the body where the impact of an object occurred and may also determine the degree and severity (e.g., velocity, directionality, size, entrance or exit wound, mass, location on body, and organ) of the impact. If the wearable device is configured with one or more inflatable bladders, this data (e.g., location of impact) may be sent to an information processing unit (e.g., on a peripheral device), which triggers the release of a pressurized medium (e.g., a gas, such as a non-flammable or an inert gas, in particular air, carbon dioxide, or argon), to the fill the bladders. Only the region where the impact has occurred will be pressurized in order to direct the flow of gas to the site of injury. The pressure provided by the bladders reduces fluid (e.g., blood) loss at the site of the site of the impact.

If the wearable device is configured with one or more biometric sensors (e.g., heart rate, respiration rate), the data collected by these sensors, before, during, or after impact, may also be transmitted to the peripheral device. The peripheral device can display various metrics related to the impact, such as the degree and severity of impact, the location on the body, and biometric data, such as heart rate and respiration rate.

The information processing unit (e.g., peripheral device) may also transmit some or all of the data collected by the sensors and analyzed by the information processing unit to a third party, such as a team member or first responder (e.g. medic). In the event of a catastrophic injury, the device may trigger an emergency alert to signal for an immediate rescue.

EXAMPLES

Example 1. Responding to an Injured Team Member

Each member of a team of four operators (users 1-4) puts on a wearable device configured to interact with (e.g., via a wired connection or BLUETOOTH® or other wireless connection) a peripheral device. The wearable device contains a plurality of multi-layered impact detection sensors, and each sensor corresponds to a zone on the wearable device. The peripheral device is configured to run a smartphone application that processes sensor data obtained from sensors on the wearable device during an event (e.g., a combat mission). Each individual device can have a GPS sensor that transmits the GPS location to each user within the team. Each device can have additional sensors (e.g., biometric sensors), such as an integrated activity sensor, an integrated respiration sensor, and an integrated heart sensor. Each device can communicate via BLUETOOTH® with the individual team member's smartphone running the application and can visually display all of the indicia from the various sensors, as well as GPS information. The smartphone is able to communicate (e.g., via radio, e.g. TW-400) with the smartphones of the other users (users 2-4) to maintain situational awareness. Each user can also communicate to a central command portal or to a third party responder.

A high impact velocity detected on the lower left side of the torso of user 1 can be displayed on a GUI. The impact detection sensors can identify the precise region where the impact occurred and the velocity of the ballistic impact. The impact detection sensors can also identify whether user 1 has an exit wound.

The microcontroller can perform computational functions, such as calculating the difference between the timestamps of the impact of each conductive layer upon impact. Furthermore, as the nonconductive layer has a known thickness, a velocity of the impact can be calculated based on the time between the impact of each conductive layer and the distance traveled between the conductive layers (e.g., the thickness of the nonconductive layer). A free running counter can be running in the FPGA. The instantaneous counter value can be latched when a sensor detects an impact. Projectile velocity can be calculated from the difference between the latched timer values from detected impacts of the inner and outer conductive layers, along with a priori knowledge of the thickness of the non-conductive layer. A software program, e.g., running on a peripheral device (e.g., MCU, BLE, and smartphone), can translate the time and thickness values into velocity and position.

The wearable device can then activate one or more inflatable bladders at the site of the impact or within a zone including the impact site in order to apply pressure on the wound. By processing the data from the impact detection sensors, the peripheral device is able to calculate the projectile weight and caliber of the projectile, the velocity of the impact, and the direction from where the impact came. Once the high velocity impact is detected, the system can send out the impact location on the body and the user information to the other team members and can begin to continuously transmit vital sign information, including heart rate and respiration rate.

Another team member (e.g., user 2) can identify that the first team member has been injured and can locate the user on the map. The team member or can follow the injured team member's GPS location on the GUI of his own peripheral device, which can be in communication with his own wearable device. The team member can establish the directionality of the impact based on the sensor data, thus avoiding that area during his route to retrieve the injured user. When the team member arrives at the injured team member, he can click on the location of the user on the map shown on his peripheral device to obtain information about the injured user. The team member can begin to input details about the injured user on the touch screen of his user interface. The team member can identify the type of injury (e.g., one caused by an RPG) and can input this information into the application running on his peripheral device. The application can begin to fill out an electronic user information card with the information input by the responder. The team member may identify a second injury on user 1 (e.g., an injury to the right arm) and can perform some routine medical tests to check the injured user's blood pressure and pain scale. The team member can apply a pressure dressing to the arm wound and can administer an antibiotic to the injured user to prevent rapid onset of infection. After stopping the bleeding in the torso and the right arm, the team member can put the arm in a splint and can enter an additional note that the injured team member is diabetic.

The additional sensors (e.g., biometric sensors) of the wearable device can also be used to sense if the condition of the injured user deteriorates. If the bladders exerting pressure on the torso wound fail to prevent a drop in blood pressure, the sensors can detect this change. The blood pressure can be continuously monitored and displayed on the GUI and of the peripheral device. An alert can sound when the blood pressure drops to a dangerous level. The team member can immediately recognize that a medical evacuation is necessary. The team member can input the GPS location of the injured user in the application by clicking on the map on the user interface and can transmit the electronic user information card of the injured team member to another user or a third-party responder, such as a medical evacuation team. The responder can alert the medical evacuation team that the situation is urgent, a ventilator is required for the injured team member, and that an enemy troop is located nearby, requiring the evacuation team to proceed with caution. The team member can mark the pickup zone with a panel and can send a finalized alert message. The team member can input his radio frequency for an additional line of communication while awaiting evacuation. The medical evacuation team may then arrive in a helicopter prepared with the necessary treatment accessories based on the user's injuries. The evacuation team can also be equipped with insulin to treat the injured member's diabetes. The medical team can resuscitate the user, if necessary, and can transport him to the local base hospital.

Example 2. Responding to a Vehicle Under Duress

A military vehicle can be equipped with a device including a plurality of multi-layered impact detection sensors located throughout the surface and interior of the vehicle. The device can be used to sense damaged caused by, e.g., a landmine that explodes while the vehicle is transporting troops to their base. The device can generate data showing damage that occurred to the front right tire and the hood of the vehicle. The device can also indicate that the engine is still working. A third party mechanic operating a peripheral device configured to run or access an application can be alerted that the vehicle has been struck. The sensor data can be processed by the application to indicate to the mechanic that the destruction of the vehicle was caused by a high force impact (e.g., landmine) and can indicate exactly where on the vehicle the impact struck. The mechanic can arrive to tend to the broken vehicle. If the broken vehicle experiences additional bullet impacts to the windows and right side of the vehicle during repair, the device can send this impact data generated by the sensors of the device to the mechanic. The mechanic operating the peripheral device can determine from the device information, such as the direction of the bullets and their likely source (e.g., based on velocity data). The device can also inform about the mass, velocity, and caliber of the bullets. The mechanic can signal for backup and can alert the troops in the broken vehicle about the situational status.

OTHER EMBODIMENTS

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims.

Other embodiments are within the claims.

The invention claimed is:

1. A system comprising an impact detection sensor, a microcontroller, a counter, and a clock connected to the microcontroller, wherein the impact detection sensor comprises a nonconductive layer disposed between two conductive layers, wherein each conductive layer comprises an interdigitated pattern or a substantially concentric pattern and an electrical circuit connected to the microcontroller and is configured to generate a signal in response to an impact; wherein the sensor is configured to generate the signal upon breakage of the electrical circuit following the impact.

2. The system of claim 1, further comprising a peripheral device configured for wired or wireless connection to the impact detection sensor.

3. The system of claim 2, wherein:
   (a) the wireless connection is a BLUETOOTH® connection; or
   (b) the peripheral device comprises a graphical user interface (GUI) and one or more processors coupled to the GUI, wherein, optionally, the GUI is configured to display one or more metrics related to the impact selected from the group consisting of velocity, directionality, size, entrance or exit, and mass.

4. The system of claim 1, wherein:
   (a) the clock is configured to calculate a timestamp of the impact to each conductive layer; or
   (b) the counter is configured to count a time between the timestamp of the impact to each of the conductive layers.

5. The system of claim 4, wherein the microcontroller, the counter, and the clock are configured to calculate a velocity of the impact based on the thickness of the nonconductive layer and the time between the timestamp of the impact to each of the conductive layers.

6. A garment comprising the system of claim 1.

7. The garment of claim 6, wherein:
   (a) the garment is configured to be worn as a shirt, a vest, a jacket, shorts, bodysuit, pants, a hat, gloves, shoes, or socks; and/or
   (b) the garment comprises a pocket.

8. The garment of claim 7, wherein the pocket is configured to hold an electronic module.

9. The garment of claim 8, wherein the electronic module is configured to connect to a lead of the electrical circuit.

10. The garment of claim 7, wherein the garment is a shirt, and the pocket is positioned below a collar and on the back of the shirt.

11. The garment of claim 6, wherein the garment comprises a plurality of the impact detection sensors, wherein each of the impact detection sensors corresponds to a zone of the garment.

12. The garment of claim 11, wherein each said zone corresponds to an organ or a location on a body of a subject wearing the garment.

13. The garment of claim 11, wherein the garment comprises an electronic module configured to connect to a lead of each electrical circuit of the plurality of impact detection sensors.

14. A wearable device comprising the system of claim 1 and one or more inflatable bladders.

15. The wearable device of claim 14, wherein the one or more inflatable bladders are configured to inflate upon a signal generated by the impact detection sensor and/or expand during inflation, thereby producing a pressure that reduces fluid loss at the site of the impact, wherein, optionally, the fluid is blood and/or the pressure is at least 2 psi, from about 2 psi to about 50 psi, or from about 5.8 psi to about 19.3 psi.

16. A method of detecting an impact using the system of claim 1 comprising generating a signal upon breakage of the electrical circuit produced by the conductive layers.

17. The method of claim 16, wherein the impact detection sensor is connected to a field-programmable gate array (FPGA).

18. The method of claim 16, further comprising:
(a) calculating a timestamp of the impact of each of the conductive layers;
(b) calculating a time between the timestamp of the impact to each of the conductive layers;
(c) calculating a velocity of the impact based on the thickness of the nonconductive layer and the time between the impact to each of the conductive layers; and/or
(d) calculating a directionality of the impact based on a location of the impact to each of the conductive layers.

19. The method of claim 16, wherein the impact detection sensor is configured as a garment or wearable device comprising the impact detection sensor, wherein, optionally, the garment or wearable device comprises a plurality of the impact detection sensors, wherein each impact detection sensor corresponds to a zone of the garment.

20. The method of claim 19, wherein:
(a) each said zone corresponds to an organ or a location on a body of a subject wearing the garment or wearable device;
(b) the garment or wearable device further comprises a peripheral device configured for wired or wireless connection to the impact detection sensor; and/or
(c) the wearable device further comprises one or more inflatable bladders.

21. The method of claim 20, wherein:
(a) the wireless connection is a BLUETOOTH® connection and/or
(b) the peripheral device comprises a GUI and one or more processors coupled to the GUI.

22. The method of claim 21, wherein the GUI is configured to display one or more metrics related to the impact, wherein, optionally, the one or more metrics is selected from the group consisting of velocity, directionality, size, entrance or exit wound, mass, location on body, and organ.

23. The method of claim 20, wherein the one or more inflatable bladders inflate upon a signal generated by the impact detection sensor and/or expand during inflation, thereby producing a pressure that reduces fluid loss at the site of the impact, wherein, optionally, the fluid is blood and/or the pressure is at least 2 psi, from about 2 psi to about 50 psi, or from about 5.8 psi to about 19.3 psi.

24. The system of claim 1, wherein:
(a) the nonconductive layer is a fabric;
(b) the conductive layers comprise conductive ink and/or conductive thread;
(c) the conductive layers comprise a conductive metal;
(d) the nonconductive layer has a thickness of from about 0.001 mm to about 100 mm; and/or
(e) the circuit comprises a set reset latch, a gate, and/or a field-programmable gate array (FPGA).

25. The system of claim 24, wherein:
(a) the conductive ink is imprinted on the nonconductive layer;
(b) the conductive thread is embroidered on the nonconductive layer;
(c) the conductive metal comprises one or more of silver, copper, gold, aluminum, and zinc; and/or
(d) the thickness is from about 0.01 mm to about 5 mm.

26. The system of claim 1, wherein the nonconductive layer has a thickness of 0.001 mm to about 100 mm.

27. The system of claim 1, wherein each conductive layer comprises an interdigitated pattern or a substantially concentric pattern.

* * * * *